(12) United States Patent
Curiel

(10) Patent No.: US 7,559,647 B2
(45) Date of Patent: Jul. 14, 2009

(54) APPARATUS, SYSTEM AND METHOD FOR FASTENING ARTICLES TO FACE OR HEAD

(76) Inventor: Armando Curiel, 1730 Billy Casper Dr., El Paso, TX (US) 79936

( * ) Notice: Subject to any disclaimer, the term of this patent is extended or adjusted under 35 U.S.C. 154(b) by 208 days.

(21) Appl. No.: 11/203,462

(22) Filed: Aug. 12, 2005

(65) Prior Publication Data

US 2006/0077340 A1 Apr. 13, 2006

Related U.S. Application Data

(60) Provisional application No. 60/617,182, filed on Oct. 8, 2004.

(51) Int. Cl.
*G02C 1/00* (2006.01)
(52) U.S. Cl. ........................ 351/158; 351/103; 351/123; 351/130
(58) Field of Classification Search ................... 351/41, 351/44, 47, 48, 57, 58, 103–109, 111–139, 351/158
See application file for complete search history.

(56) References Cited

U.S. PATENT DOCUMENTS

| 375,964 | A | | 1/1888 | Tryner | |
|---|---|---|---|---|---|
| 1,879,216 | A | * | 9/1932 | Hannan et al. | 2/12 |
| 2,999,136 | A | * | 9/1961 | Holt et al. | 381/323 |
| 3,000,462 | A | * | 9/1961 | Smith | 181/130 |
| 4,169,665 | A | | 10/1979 | McCulloch | |
| 4,240,718 | A | * | 12/1980 | Wichers | 351/62 |
| 4,328,620 | A | * | 5/1982 | Mack et al. | 33/514 |
| 4,787,729 | A | * | 11/1988 | Ruffen | 351/137 |
| 4,822,158 | A | * | 4/1989 | Porsche | 351/57 |
| 4,953,967 | A | * | 9/1990 | Somerville | 351/136 |
| 5,583,586 | A | * | 12/1996 | Evans | 351/130 |
| 5,781,272 | A | * | 7/1998 | Bright et al. | 351/123 |
| 6,176,576 | B1 | | 1/2001 | Green et al. | |
| 6,278,501 | B1 | * | 8/2001 | Lin | 349/13 |
| 6,942,337 | B2 | * | 9/2005 | Zelman | 351/47 |

FOREIGN PATENT DOCUMENTS

| DE | 3400714 | * | 7/1985 | | 351/123 |
|---|---|---|---|---|---|
| DE | 4204544 | * | 8/1993 | | 351/41 |
| FR | 2814248 | * | 3/2002 | | 351/124 |

* cited by examiner

*Primary Examiner*—Huy K Mai
(74) *Attorney, Agent, or Firm*—Kevin Lynn Wildenstein

(57) ABSTRACT

The present invention is an apparatus, system or method for attaching one or more articles to the human head which is adapted, in one or more embodiments, to substantially reduce or eliminate human ailments associated with the use of frames in the face area of the human head. Accordingly, in one embodiment, the present invention comprises a frame having two arms, a forehead bridge connecting the arms therebetween, a nasion bridge substantially centered at one end upon the forehead bridge, and a nasion base at another end, the present invention adapted to substantially reduce or eliminate human ailments associated with the use of frames in the face area of the human head.

9 Claims, 30 Drawing Sheets

APPARATUS, SYSTEM AND METHOD FOR FASTENING ARTICLES TO FACE OR HEAD

CLAIM OF PRIORITY

The present invention claims priority based upon U.S. Provisional Patent Application No. 60/617,182, filed Oct. 8, 2004, which is hereby incorporated by reference.

FIELD OF INVENTION

The invention relates generally to an apparatus, system or method for fastening articles to the face or head, and more particularly, to a frame apparatus adapted to precisely, securely and comfortably retain one or more items thereon resulting in substantially reducing or eliminating human ailments caused by the pressure points of frames in the face and side areas of the human head.

BACKGROUND OF THE INVENTION

Numerous frame constructions for the human face have been disclosed in the prior art. In the past, unfortunately, frames have never been designed or adapted to end the problems caused by the use of conventional eyeglass frames. In particular, the general public and the eyeglass industry are aware that conventional eyeglass frames likely are the origin of many medical symptoms, including pain, headaches, sinus congestion, stress and all of these symptoms' secondary effects such as irritability, sleeplessness, depression, and anxiety which leads to adrenaline release, which in turn leads to hypertension, cardiovascular disease, gastrointestinal disease and many other secondary effects, but the industry has failed to adapt the frames to alleviate such ailments. Until the present invention, the industry's response has been to reduce, but not solve, the cause of these ailments directly associated with wearing conventional eyeglass frames. The industry's efforts to reduce these symptomatic ailments have been largely limited to reduction of the weight and/or shape of the eyeglass frame and, to reducing the weight and/or shape of the eyeglass optics, thereby sacrificing the quality of the materials used in either the eyeglass frame or lens.

Many eyeglass frame disclosures exist in the prior art. For example, U.S. Pat. No. 6,557,995 B1 to Rose discloses a frameless glass which attach to studs or other objects artificially inserted into the human body (such as metal studs hanging from one's eyebrow or nose). This disclosure also generally provides a broad background of prior art related to the eyeglass frame art.

U.S. Pat. No. 4,169,665 discloses an eyeglass frame having arms (or, "bows") connected to a front frame portion on one end, and having two load bearing points arranged to engage two points on a single human ear to resist any rotation or movement of the front frame portion on the human head. In one embodiment, the arm is constructed as a complex bend at the load bearing point end, while in another embodiment, the arm is constructed as a solid mold. The focus of this disclosure is that through the arms' engagement with a certain portion of the human ears, the overall eyeglass frame's movement on the human head is minimized.

U.S. Pat. No. 6,176,576 B1 discloses eyewear that has frames having audio devices capable of providing an audio signal to the user of the eyewear. While this patent also discloses that the eyewear is supported by a human ear's concha, the disclosure is directed squarely with providing audio to the user, and it fails to recognize the various human physiological advantages inherent in such a support structure.

A slightly similar apparatus is disclosed in U.S. Pat. No. 4,632,104, which too, fails to appreciate the human physiological advantages inherent in use of the human ear as a support mechanism.

None of the foregoing prior art disclosures discuss any benefits or disadvantages of an eyeglass frame which is adapted to alleviate any ailments typically associated with use of an eyeglass frame. Conventional eyeglass frames usually press the human head at numerous points along the interior portion of the frames. For example, each arm in a conventional frame presses the human skin along substantially the entire length of the frame (from behind the ear to an area close to the human eye). The frame portion adjacent to the human eyebrows usually skims or constantly touches the eyebrows along a substantial portion of length. Lastly, the nose pieces of a conventional eyeglass frame is in constant contact with a substantial area of the nose bones. It is common knowledge that this constant pressure of the human skin is a major source of human pathophysiology. For example, the human face is known to be a rich source of high flow veins, arteries, capillaries and superficial nerves, so that restriction of blood in this area and irritation of nerves (by constant rubbing, touching or pressure from an eyeglass frame, for example) is believed to adversely affect other parts of the human body (including the human brain). Stress for instance, depletes neurotransmitters. This depletion of neurotransmitters will deplete the following "feel good" transmitters: ENDORPHINS (Opioids): Mood elevating, enhancing, euphoric. The more present, the happier you are! Natural pain killers; NOREPINEPHRINE: Excitatory, feel happy, alert, motivated. Anti-depressant, appetite control, energy, sexual arousal; DOPAMINE: Feelings of bliss and pleasure, euphoric, appetite control, controlled motor movements, feel focused; ACETYLCHOLINE: Alertness, memory, sexual performance, appetite control, release of growth hormone; and PHENYLETHYLMINE (PEA): Feelings of bliss, involved in feelings of infatuation (high levels found in chocolate). This depletion results in a reduction of transmitters needed for sleep, as well as pain blocking transmitters. Depleted supplies of "feel good" transmitters means it will be impossible for a person to feel happy, upbeat, motivated or on track. The person, in contrast, will feel just the opposite, having a decrease in energy and interest, feelings of worthlessness and a pervasive sense of helplessness to control the course of the person's life. Certain transmitters, when depleted, may cause you to be easily agitated or angered, experience mild to severe anxiety and have sleep problems. A person may feel more psychological and physical pain. These can all be symptoms of neurotransmitter insufficiency.

It is further believed that the front portion of the human forehead includes areas of natural endorphin and dopamine— releasing areas activated when properly stimulated. For example, as seen in FIG. 1, there is a portion of the human skull known as the "nasion" below the skull's glabella, which can generally be defined as the area where the top of the two adjoining nasal bones intersect with the forehead bone area. The nasion area, when properly stimulated through gently applied pressure, is believed to communicate with the brain to release endorphins and dopamine.

Accordingly, it is an object of the present invention to substantially decrease or eliminate the pain and discomfort a user feels when they have need for use of an eyeglass frame and to provide the option to stimulate the brain to release "feel good" neurotransmitters by increasing pressure in the nasion area and tension (pulling forward of the ears). This invention not only eliminates the inherent health hazards of wearing conventional eyeglasses, but it actually reverses de depletion of "feel good" neurotransmitters by stimulating the brain to replenish them.

It is another object of the present invention to end the restriction of normal blood flow, constant nerve irritation and consequent stress caused by the pressure points which conventional eyeglass frames place on the human face and head;

It is a further object of the present invention to end the irritable and stressful partial obstruction of peripheral vision caused by the side arms of an eyeglass frame, and partial obstruction of inward vision caused by the nose pads on both sides of the nose;

It is a further object of the present invention to end the need for constant eyeglass frame adjustment and frequent removal of the eyeglass frame from the human head in order to relieve pressure and pain by providing a novel, permanent, secure and comfortable and precise fit eyeglass frame;

It is a further object of the present invention to provide an eyeglass frame which does not fall down off the face or slides down the face;

It is a further object of the present invention to provide an eyeglass frame which eliminates the need for additional mechanical devices needed to retain the eyeglass frame to the head while participating in vigorous activities such as sports, military training or combat;

It is a further object of the present invention to provide an eyeglass frame which prevents or substantially eliminates any bruises to the human head caused by the pressure points;

It is a further object of the present invention to provide an eyeglass frame which prevents or substantially eliminates the need to remove the eyeglass frame in order to comb one's hair, and an eyeglass frame which prevents displacement of the hair when used;

It is a further object of the present invention to provide an eyeglass frame which is adapted to securely and comfortably support heavier optic lenses;

SUMMARY OF THE INVENTION

The following summary of the invention is provided to facilitate an understanding of some of the innovative features unique to the present invention, and is not intended to be a full description of variations that may be apparent to those of skill in the art. A full appreciation of the various aspects of the invention can be gained from the entire specification, claims, drawings, and abstract taken as a whole.

This invention relates to an apparatus, system or method for attaching one or more articles to the human head which is adapted, in one or more forms, to substantially reduce or eliminate human pathophysiology associated with the use of frames in the face area of the human head.

Accordingly, in one embodiment, the present invention comprises a frame having two arms or temples, a forehead bridge connecting the arms therebetween, a nasion bridge substantially centered at one end upon the forehead bridge, and a nasion base at another end, the present invention adapted to substantially reduce or eliminate human pathophysiology associated with the use of frames in the face area of the human head.

In another embodiment, the present invention may include optics coupled to the frame in any number of locations. For example, optics in the form of eyeglass lenses may be placed equidistantly apart on the frame thereby functioning like conventional eyeglass frames, but having the added benefit of substantially reducing or eliminating human pathophysiology associated with the use of frames in the face area of the human head. In still another embodiment, an imaging enhancement means (such as, for example, a microscope on one hand, or a pair of binoculars on the other hand) may be adjustably coupled to the frame to allow a user to selectively utilize the imaging enhancement means in a comfortable, yet stable, position.

The novel features of the present invention will become apparent to those of skill in the art upon examination of the following detailed description of the preferred embodiment or can be learned by practice of the present invention. It should be understood, however, that the detailed description of the preferred embodiment and the specific examples presented, while indicating certain embodiments of the present invention, are provided for illustration purposes only because various changes and modifications within the spirit and scope of the invention will become apparent to those of skill in the art from the detailed description, drawings and claims that follow.

BRIEF DESCRIPTION OF THE DRAWINGS

The accompanying figures further illustrate the present invention and, together with the detailed description of the preferred embodiment, assists to explain the general principles according to the present invention.

FIG. 3b illustrates a rear side perspective view of the embodiment shown in FIG. 3a;

FIG. 3c illustrates a left side plan view of the embodiment shown in FIG. 3a;

FIG. 3d illustrates a front plan view of the embodiment shown in FIG. 3a;

FIG. 3e illustrates a rear plan view of the embodiment shown in FIG. 3a;

FIG. 3f illustrates a bottom plan view of the embodiment shown in FIG. 3a;

FIG. 5b illustrates a front right side perspective view of the embodiment shown in FIG. 5a;

FIG. 6b illustrates a front right side perspective view of the embodiment shown in FIG. 6a;

FIG. 8b illustrates a front plan view of the embodiment shown in FIG. 8a;

FIG. 8c illustrates a front perspective view of the embodiment shown in FIG. 8a;

FIG. 8d illustrates a left side plan view of the embodiment shown in FIG. 8a;

FIG. 8e illustrates a top plan view of the embodiment shown in FIG. 8a;

FIG. 8f illustrates a right side plan view of the embodiment shown in FIG. 8a;

FIG. 12b illustrates a front plan view of the embodiment shown in FIG. 12a;

FIG. 12c illustrates a right side plan view of the embodiment shown in FIG. 12a;

FIG. 12d illustrates a left side plan view of the embodiment shown in FIG. 12a;

FIG. 12e illustrates a top plan view of the embodiment shown in FIG. 12a;

FIG. 12f illustrates an exploded view of exemplary blocks formed on or connected to the frame shown in FIG. 12a; and FIG. 12g illustrates a front perspective view of the embodiment shown in FIG. 12a.

Additional aspects of the present invention will become evident upon reviewing the non-limiting embodiments described in the specification and the claims taken in conjunction with the accompanying figures, wherein like reference numerals denote like elements.

DETAILED DESCRIPTION OF THE PREFERRED EMBODIMENT

Figure 1A:
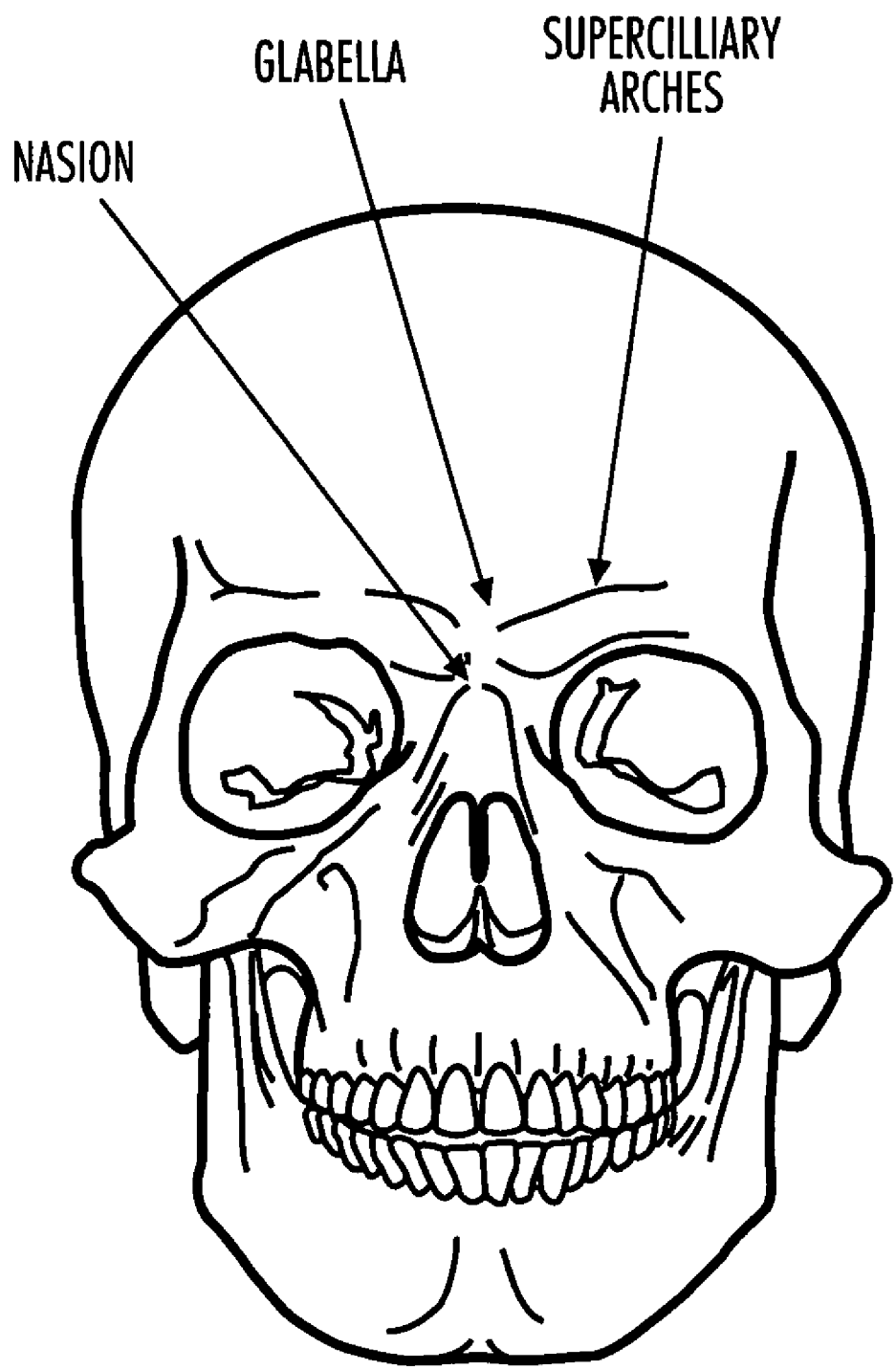
FIG. 1a is a front plan view of a representative human skull.
Figure 1B:
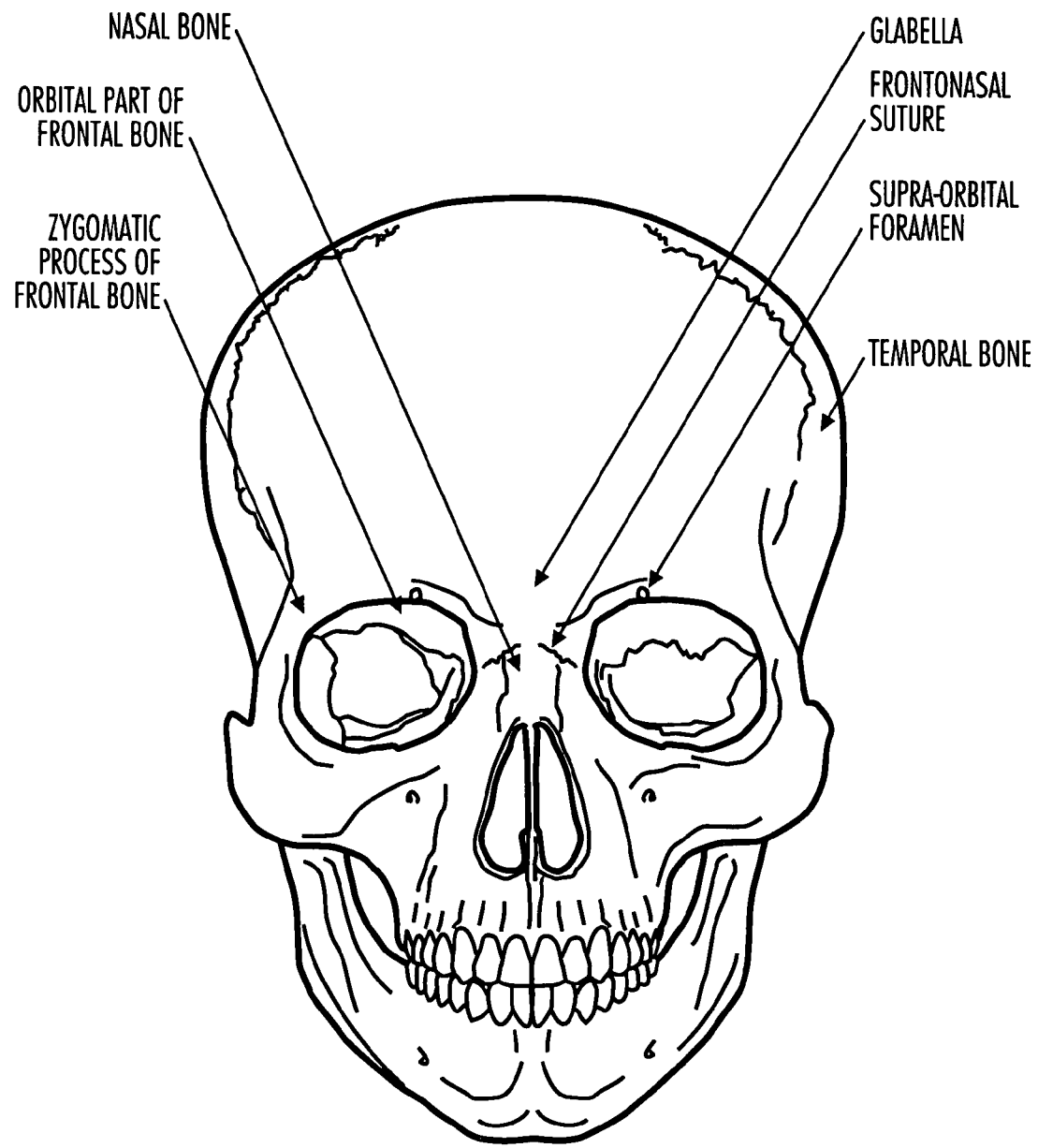
FIG. 1b is another front plan view of a representative human skull.

FIGS. 3a-3h illustrate one preferred embodiment of the present invention. As seen in these Figures, the present invention includes a frame 10 having two arms $31_1$, $31_x$ (where x=1, 2, 3 ... ), a forehead bridge 41 connecting the arms therebetween, and a nasion portion 50 having a nasion bridge 51 substantially centered upon the forehead bridge 41 at one end, and a nasion base 53 at another end, the present invention adapted to substantially reduce or eliminate human ailments associated with the use of frames in the face area of the human head.

Figure 2:
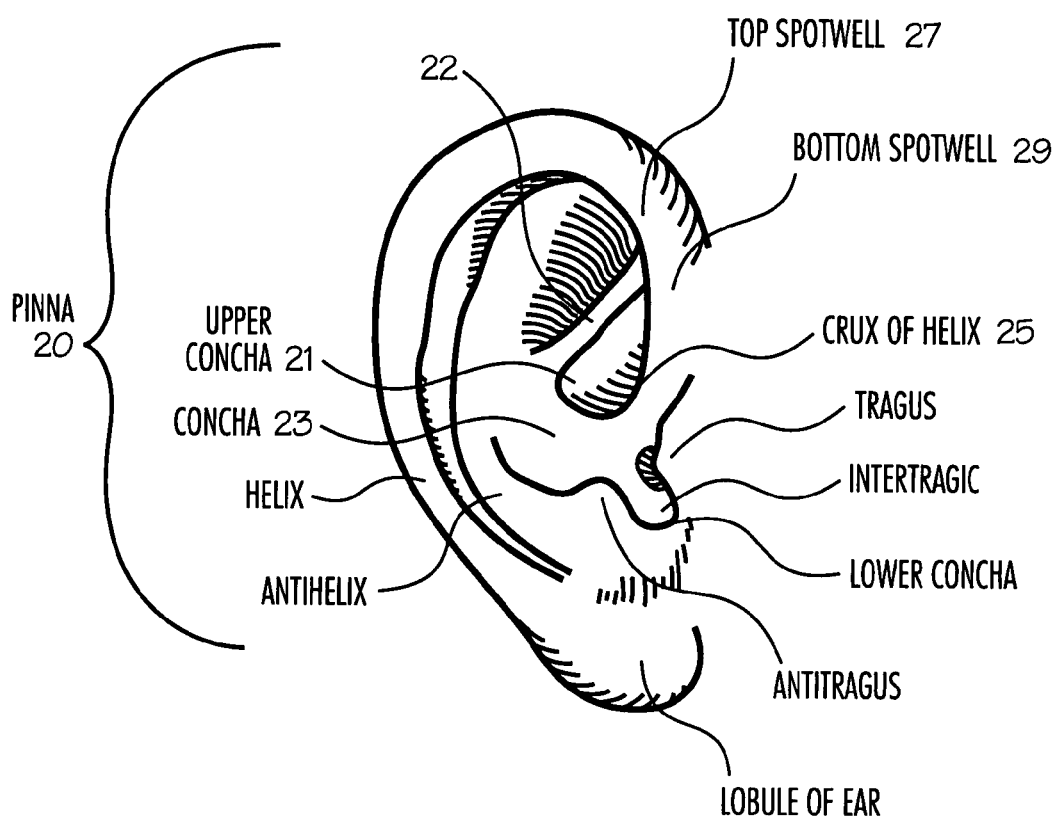
FIG. 2 is a side perspective view of a representative human ear.

Initially, one should understand the structure of the human head in order to fully appreciate the several advantages of the present invention. As seen in FIG. 2, the human ear's pinna (also known as the auricle) 20 is comprised of various-named portions formed of primarily skin-covered cartilage, including the human ear upper concha 21, concha 23, crux of helix 25, top spotwell 27 and bottom spotwell 29. It is believed that stimulation of the human concha, by slightly pulling forward whether upper concha 21 or concha 23, results in the stimulation of the brain to produce endorphins and dopamine.

Turning now to FIGS. 3a-3h, each arm $31_1$, $31_x$ may comprise an ear bud $33_x$, an optional length adjuster $35_x$, an elongated portion $37_x$ attachable to the forehead bridge 41. A representative ear bud $33_x$ is shown in exploded view in FIG. 3h. In this embodiment, the ear bud $33_x$ may comprise an inner concha portion 33a surrounding by a protective shell 33c. The inner concha portion 33a is, in one embodiment, adapted to securely and comfortably fit within a human ear's concha (as seen in FIG. 2). In the embodiment illustrated in FIG. 3h, the inner concha portion 33a is a half sphere having an arm connector 33b, similar to a mushroom-shaped design, substantially surrounded by a protective covering 33c such as a silicon pad. The protective covering, while optional, may be extremely useful in protecting the human concha from being cut or otherwise punctured. Silicon is a preferred choice for the protective covering because it is relatively inexpensive, easy to mold, and capable of long, repeatable use without wear or tear. Moreover, silicon is typically believed to be anti-allergenic, is a standard material used in the art, and maintains consistency when used. In this embodiment shown, the arm connector 33b attaches or couples to a loop $36_x$ of the arm elongated portion $37_x$, so that if the ear bud $33_x$ ever needs replacement, it can be accomplished easily.

Figure 3A:
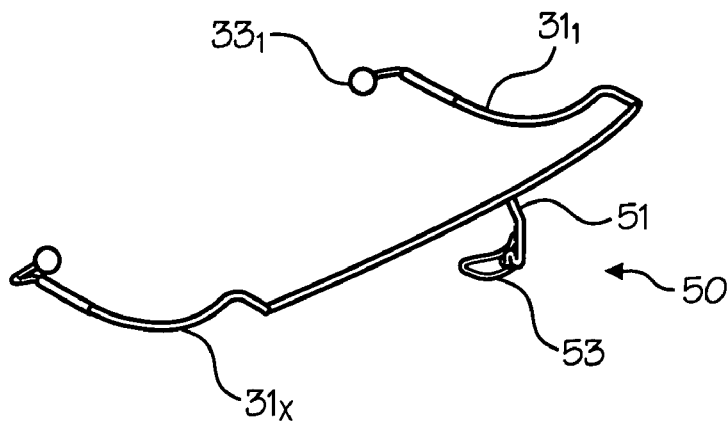
FIG. 3a illustrates a front side perspective view of one embodiment of the present invention.
Figure 3B:
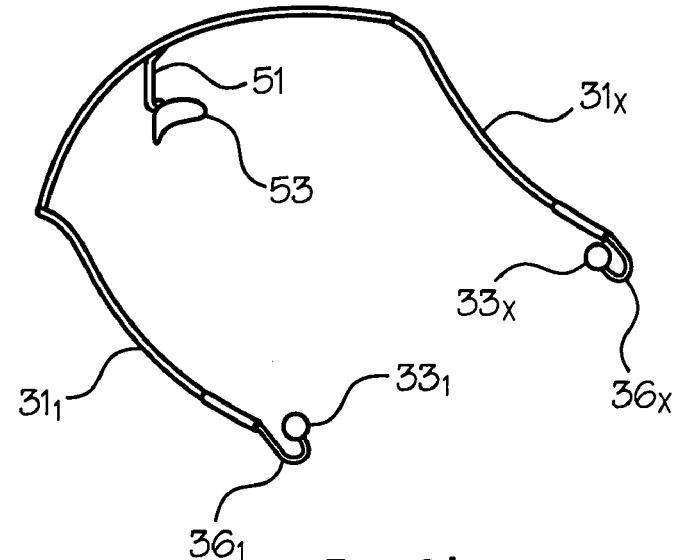
Figure 3C:
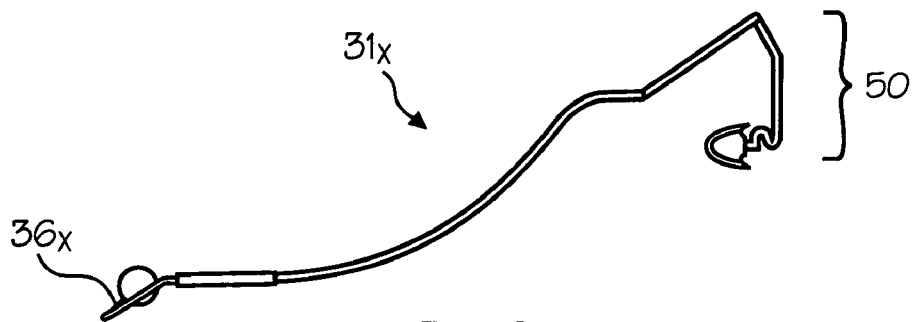
Figure 3D:
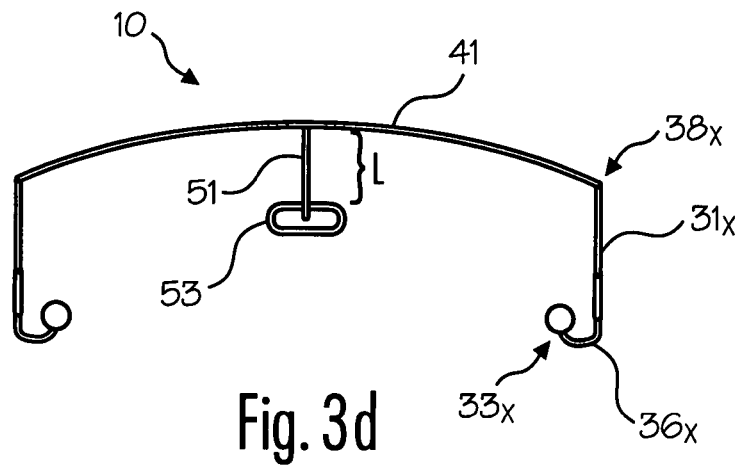
Figure 3E:
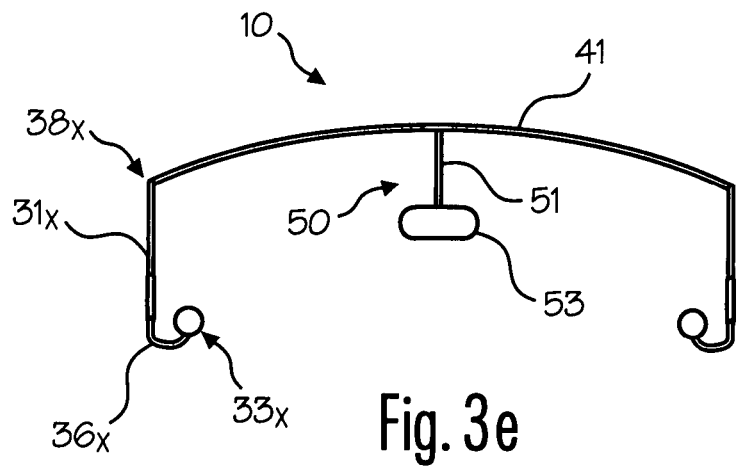
Figure 3F:
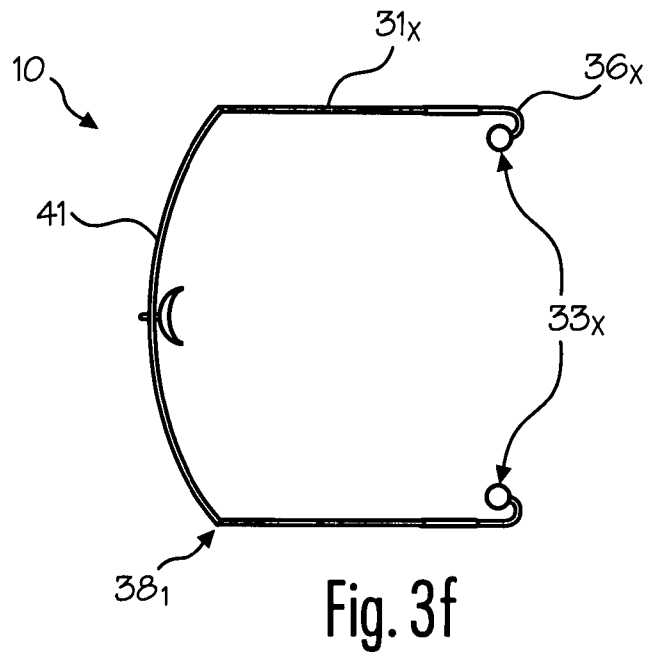
Figure 3G:
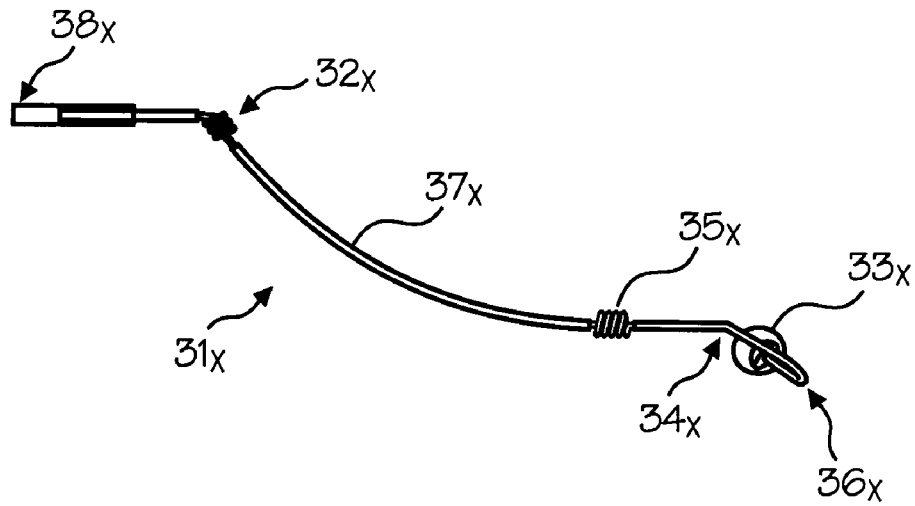
FIG. 3g illustrates a side plan view of another arm embodiment according to the present invention.
Figure 3H:
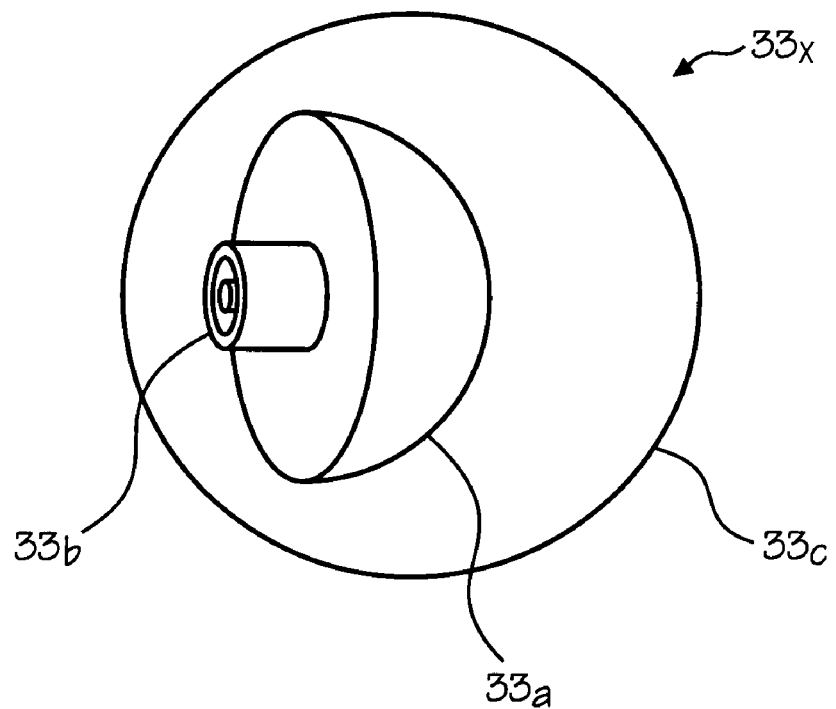
FIG. 3h illustrates an exploded view of an exemplary ear bud according to the present invention.

As seen in FIG. 3g, each ear bud $33_x$ may be coupled to an angle portion or break ear bud $34_x$. Angle portion or break ear bud $34_x$, in one embodiment, is formed with an approximately fifty (50) degree angular break, but could be formed in one embodiment with a ten degree (plus or minus) angular configuration depending on the shape of a user's head in relation to the frame position on the head. In the preferred embodiment, the angle is formed so that it does not touch the portion of inner human ear cartilage (identified as element 22 in FIG. 2) above the upper concha 21 and located generally between the human ear's top spotwell 27 and the bottom spotwell 29. The particular formation of this cartilage 22 on every user dictates the angle at which the angle should be formed to prevent the remainder of the frame from touching or pressing against the cartilage 22. Angle portion $34_x$ is a useful adjustable component of the present invention because, like the adjustable loops $36_1$, $36_x$ disclosed below, each angle portion $34_x$ is preferably adapted to move the arms $31_x$ away from the side of the head.

As seen in FIGS. 3a-3h, adjustable loop $36_x$ interconnects the ear bud $33_x$ to a tail or distal end of each arm $31_x$. Loop $36_x$ is an important feature of the present invention, as each loop $36_x$ on each arm $31_x$ is adapted to either open (expand) or close (decrease), thereby moving the arms $31_x$ away from the side of the head, or moving the arms $31_x$ closer to the head. In the preferred use, the loops are adjusted so that the frame of the present invention only touches the human head in three places: the left ear (through the ear bud $33_x$), the right ear (through ear bud $33_x$) and the forehead (through either the nasion base and/, or one or more of the forehead stabilizers, as disclosed below). As will be discussed further, loops $36_x$ may also be adapted to mechanically communicate with pivot points $38_1$, $38_x$ to allow for further adjustment (such as mechanical tension) of the present invention on a human head. Those of skill in the art will realize that pivot points $38_x$ are similar to optional length adjuster $35_x$ so that these two elements can be exactly the same, or can be different.

Each tail or distal end of each arm $31_x$ is adapted to securely receive the adjustable loop $36_x$ in any conventional manner. Thus, in one example, each tail may have a female receptacle adapted to reciprocally receive a male portion from the loop $36_x$ (or, vice versa). As another adjustable feature of the present invention, in one embodiment, each tail should be malleable enough to allow for physical extension or compaction to accommodate different sized human heads.

Figure 4A:
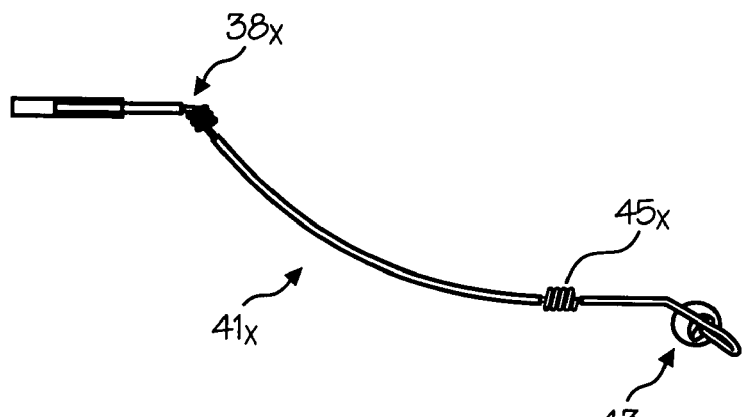
FIG. 4a illustrates a side plan view of another embodiment of the present invention.

As seen in FIGS. 3a-3h, each arm $31_x$ is securely connected at one distal end to each tail by conventional means (such as, for example, soldering, or plastic injection molding). Each arm $31_x$ is preferably constructed of strong, substantially non-malleable material, so that during manufacture, each arm is substantially and consistently manufactured. At the opposite end, each arm $31_x$ securely couples to a forehead bridge 41 by a pivot coupling means $38_x$. In one embodiment, a representative pivot coupling means $38_x$ may be a pivot spring as seen in FIGS. 3g and 4a. In this embodiment, the pivot spring functions similar to a hinge, so that the position of each arm $31_x$ relative to the forehead bridge 41 allows for angular rotation from approximately zero (0) degrees to ninety (100) degrees. Moreover, at least one hinge $32_x$ may be used in tensional relationship to each adjoining loop $36_x$ on the same arm $31_x$ so that tension on the frame 10 and distance may be adjusted by adjustment of both the loop $36_x$ and/or the adjoining hinge $32_x$ on the same arm $31_x$.

As seen in FIGS. 3a-3h, a forehead bridge 41 interconnects arms $31_1$, $31_x$. Forehead bridge 41, in one preferred embodiment, is a single unit adapted to retain or otherwise securely hold (whether in adjustable fashion or not) any third party device as may be desired by the user of the present invention. As will be described, such third party devices may include optics, shading devices, computers, or any other third party device which requires a stable foundation for a user which does not interfere with the user's field of view and the user's other appendages (such as, for example, a user's hands, feet or other appendage). Preferably, forehead bridge 41 is formed to follow the general linear curve along the human forehead above the human eye sockets ("linear curve" meaning that the structure is void of any sharp angular distortion). Forehead bridge is adapted to structurally separate each arm $31_x$ so as to allow each arm's structural recitation to function as desired.

As seen in FIGS. 3a-3f, nasion portion 50 is preferably securely attached through the nasion bridge 51 at substantially a center location to the forehead bridge 41. Nasion bridge 51 comprises a generally elongated (but adjustable) nasion bar which is coupled at a distal end to a nasion base 53. The nasion base 53 is preferably adapted to cover the vertical and horizontal surface areas of the nasion area (as illustrated in FIG. 1a), which results in the comfortable locking of the forehead bridge in relationship to the human face. Moreover, the length L of the nasion bar 51 (as seen in FIG. 3d) should preferably be of a length which allows the frame 10 to stay away from a user's field of view so that the user substantially always maintains a clear field of view. The nasion base is preferably covered by a nasion protective sheath, and is adapted to sit comfortably on a user's nasion area and substantially above a user's plane of pupils. The nasion protective sheath is preferably silicon formed due to the benefits already mentioned (including easy replacement). Further, the nasion bar 51 is preferably adjustable to account for different configurations of human heads.

Figure 3I:
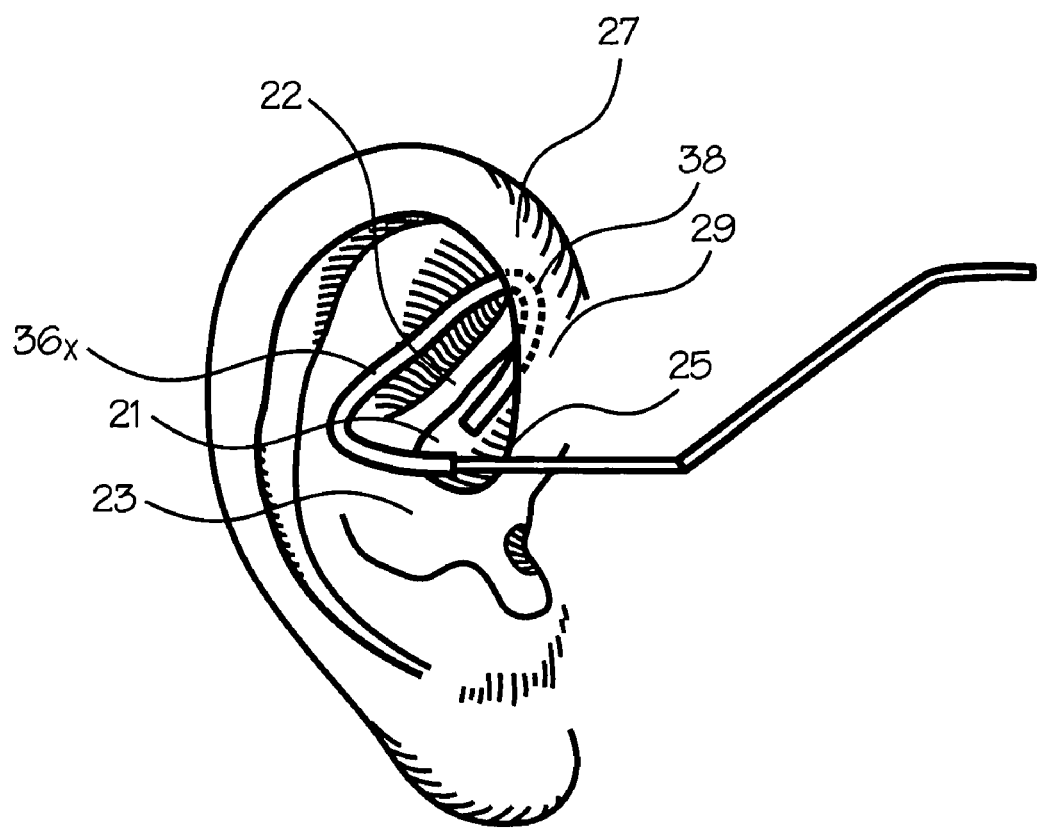
FIG. 3i illustrates another exemplary embodiment of the adjustable loops according to the present invention.

An alternate embodiment of the loops $36_x$ is shown in FIG. 3i. In this embodiment, loops $36_x$ may include a secondary loop portion 38 which is formed to fit within the flap of the human ear (and hence, should not be visible from a plan view of the side of a human ear). Preferably, secondary loop portion 38 is covered by a soft material (such as silicone or similar soft pliable material) which is adapted to securely fit within the human ear flap between the ear's top spotwell 27 and the bottom spotwell 29 comfortably for the user. This embodiment has the advantage of not requiring any further frame support on the human head (e.g., does not necessarily require any nasion bridge or forehead stabilizer frontal support).

While the foregoing embodiments may appear to call for individual parts mechanically interconnected, the foregoing disclosure is merely representative of the numerous novel characteristics of the present invention, and is mainly provided for potential manufacturing concerns. It will be readily apparent to one of skill in the art that the entire structure described herein may be formed as a single, solitary unit, or could be constructed by mechanically securing the various parts together (or, as units) as recited above.

Figure 4B:
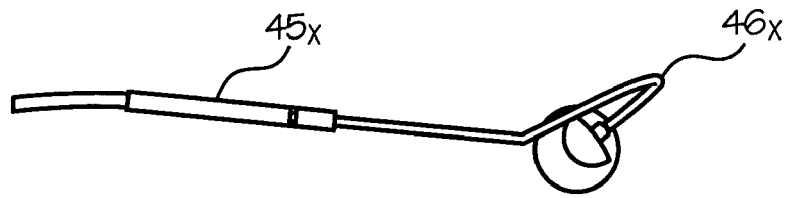
FIG. 4b illustrates a side plan view of another embodiment of the length adjustments of the present invention, with the tail in an extended position.
Figure 4C:
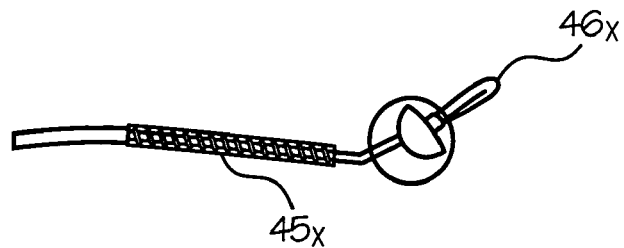
FIG. 4c illustrates a side plan view of the length adjustments shown in FIG. 4b, with the tail in an retracted position.
Figure 4D:
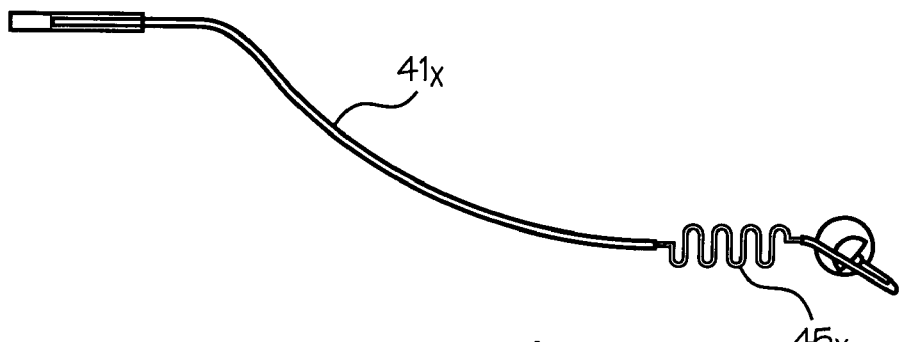
FIG. 4d illustrates a side plan view of another embodiment of the length adjustments of the present invention.
Figure 4E:
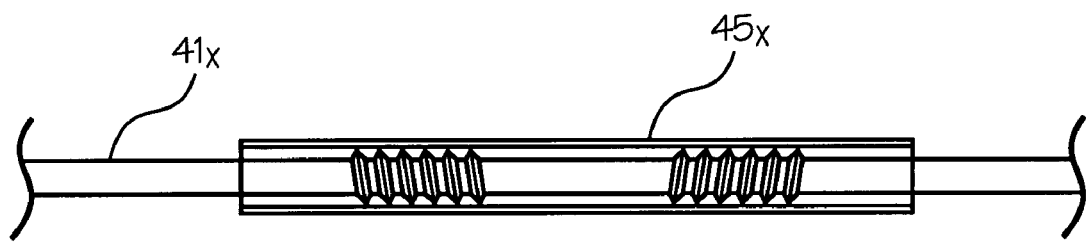
FIG. 4e illustrates a side plan view of another embodiment of the length adjustments of the present invention.

As such, further optional characteristic structures may be included. As seen in FIG. 4a, optional length adjustments $45_x$ may interconnect each loop $36_x$ to each arm $31_x$ to increase or decrease the length of the arm to accommodate different sized human heads. In one embodiment as seen in FIG. 4a, a representative length adjustment may include spirals, springs or like mechanisms. Spirals are adapted to retain their mechanical shape upon adjustment, so that unlike a spring, each spiral $45_x$ does not maintain any elastic memory. Springs, as illustrated in FIGS. 4b and 4c, which do maintain elastic memory, offer the advantage of allowing the frames to be pulled forward, without disengaging from the concha of the ears, and to rest on top of the nose or on top of the wearer's head at will, they also adjust themselves to accommodate a wide range of lengths without the need for manual mechanical length adjustments. Preferably, in this embodiment, the threading mechanism is encased in a protective sheathing such as glass or plastic, to prevent the mechanism from capturing, tugging, or pulling of hair or other nearby material. While FIG. 4b illustrates a clear sheathing, those of skill in the art will realize that any material may be used (such as clear material, opaque material or even ornamentally pleasing material), as long as the sheathing prevents the capturing, tugging, or pulling of hair or other nearby material. Of course, those of skill in the art will recognize that other forms of length adjustments may be utilized and still remain within the spirit and scope of the present invention. Thus, for example, as seen in FIG. 4d, a length adjustment comprising an undulated portion $45_x$ is disclosed which is curved or sinusoidal formation (or, it is also contemplated that this portion could be in a zig-zag or a triangular wave formation). Another exemplary embodiment of a representative length adjustment is illustrated in FIG. 4e. In this embodiment, the representative length adjustment $45_x$ comprises a screw mechanism which is formed on both ends and having threading means, with the threading means adapted to engage reciprocal threading means which may be formed on each loop $46_x$ and each tail portion $41_x$. Again, in this embodiment, the threading mechanism is encased in a protective sheathing to prevent the mechanism from capturing, tugging, or pulling of hair or other nearby material.

Figure 5A:
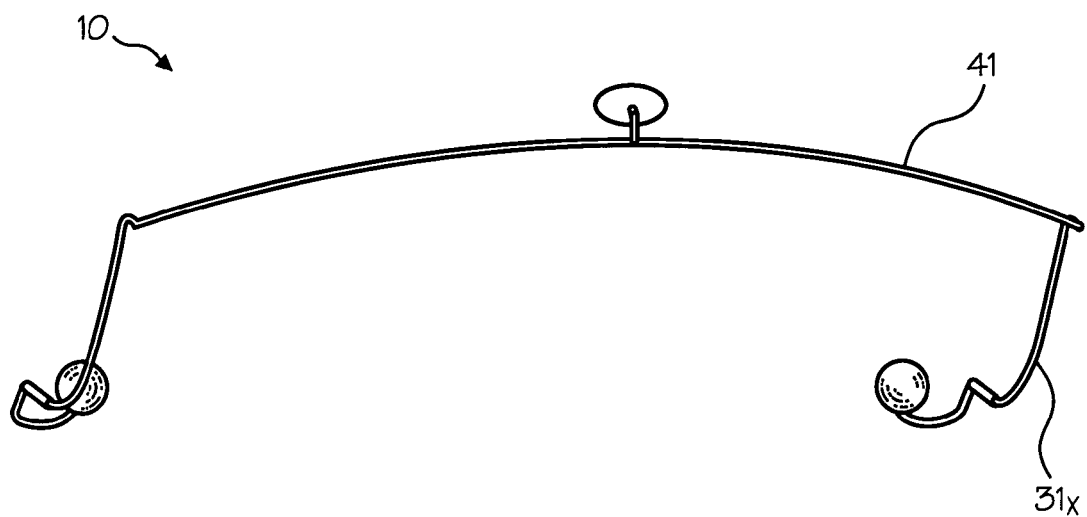
FIG. 5a illustrates a rear side perspective view of another embodiment of the present invention, featuring a forehead stabilizer.
Figure 5B:
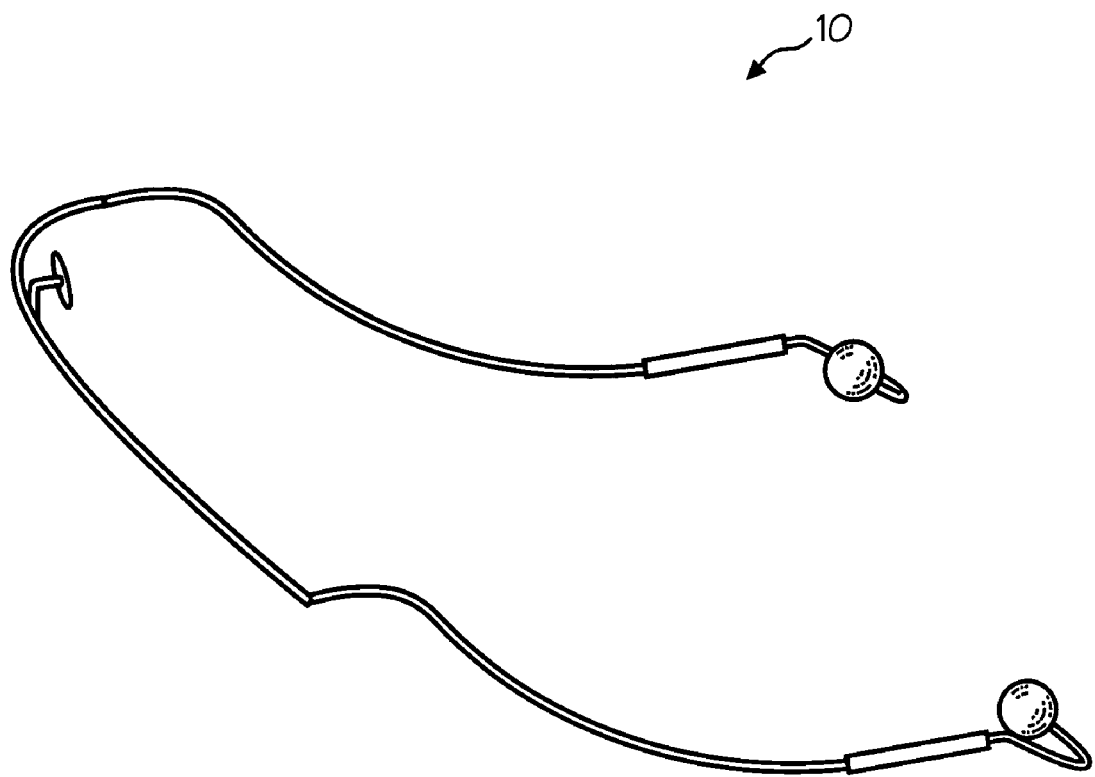

Another embodiment of the present invention is illustrated in FIG. 5a-5b. In this embodiment, at least one optional forehead stabilizer 57 is coupled to the forehead bridge 41 through a forehead bridge 55 above the forehead bridge 41 at a point substantially co-linear with the nasion bridge 50. In this embodiment, because a nasion bridge is absent, each forehead stabilizer 57 provides gentle pressure to the human forehead and also is adapted to assist in stabilizing any additional weight on the frame by the use, for example, of third party devices or articles attached to the frame 10.

Figure 6A:
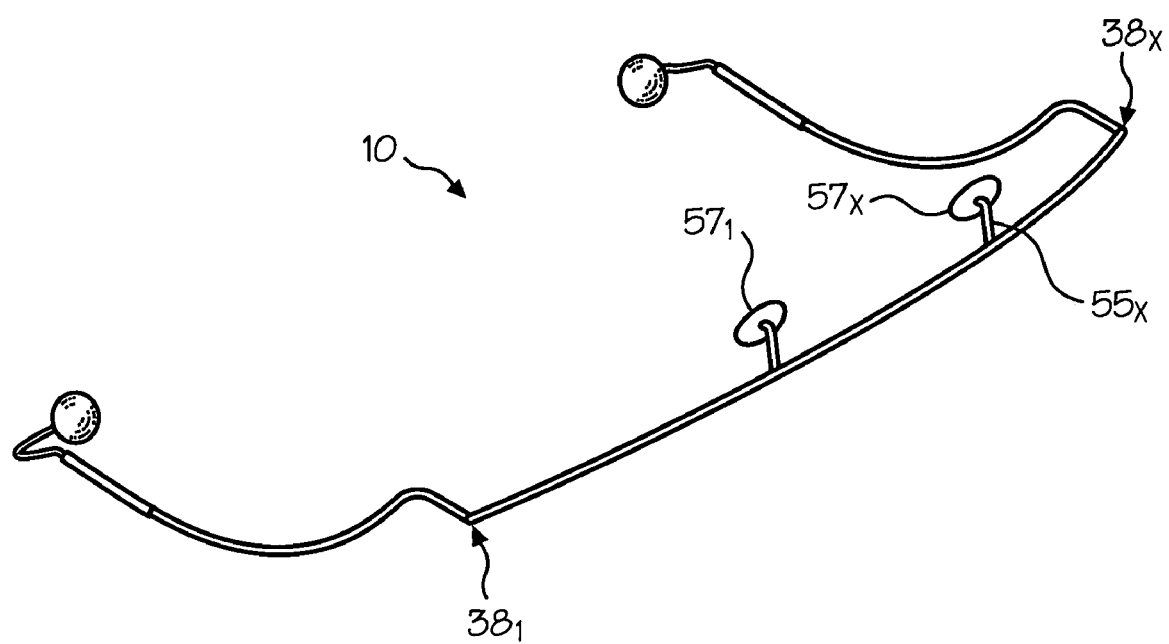
FIG. 6a illustrates another embodiment of the present invention, featuring a plurality of forehead stabilizers.
Figure 6B:
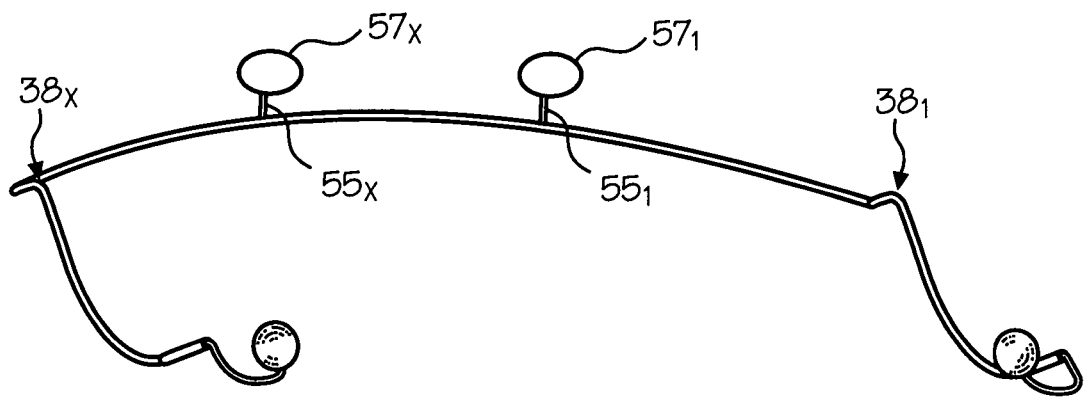

Another embodiment of the present invention is illustrated in FIG. 6a-6b. In this embodiment, a plurality of optional forehead stabilizers $57_x$ are coupled to the forehead bridge 41 above the forehead bridge 41. In this embodiment, because the nasion bridge is absent, the forehead stabilizers $57_1$, $57_x$ are located on and above the forehead bridge 41 through forehead stabilizer bridges $55_1$, $55_x$ at points substantially equidistant between each pivot point $38_1$, $38_x$. Those of skill in the art will realize that a plurality of forehead stabilizers may be used, and be variously placed along the forehead bridge 41 as desired by the end-use application.

Figure 7A:
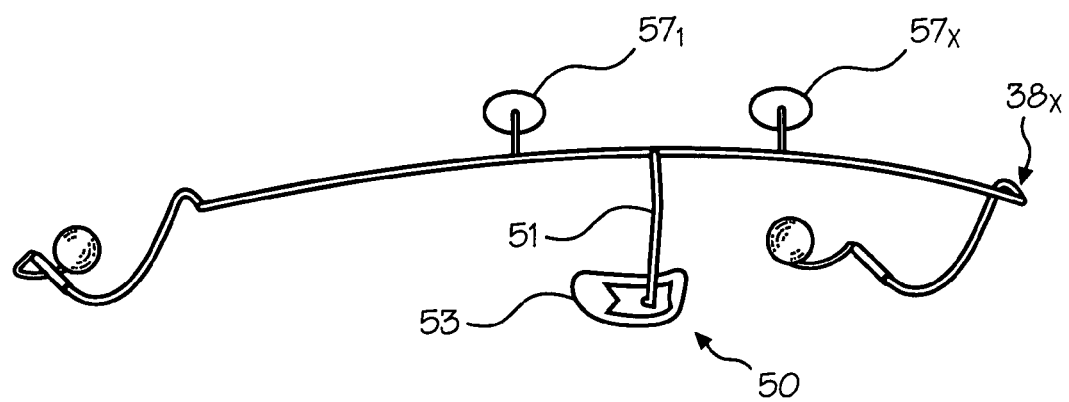
FIG. 7a illustrates another embodiment of the present invention, in particular, a front side perspective view featuring a plurality of forehead stabilizers and at least one nasion stabilizer.
Figure 7B:
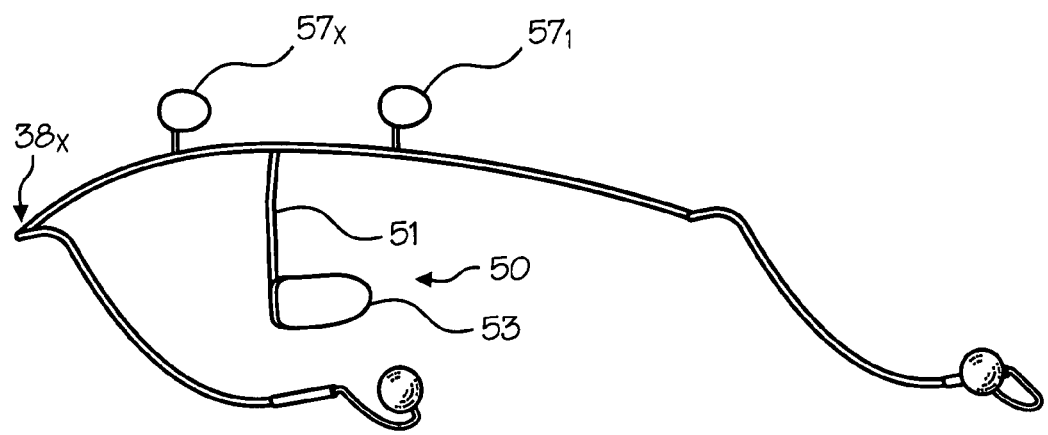
FIG. 7b illustrates another embodiment of the present invention, in particular, a rear side perspective view featuring a plurality of forehead stabilizers and at least one nasion stabilizer.
Figure 8A:
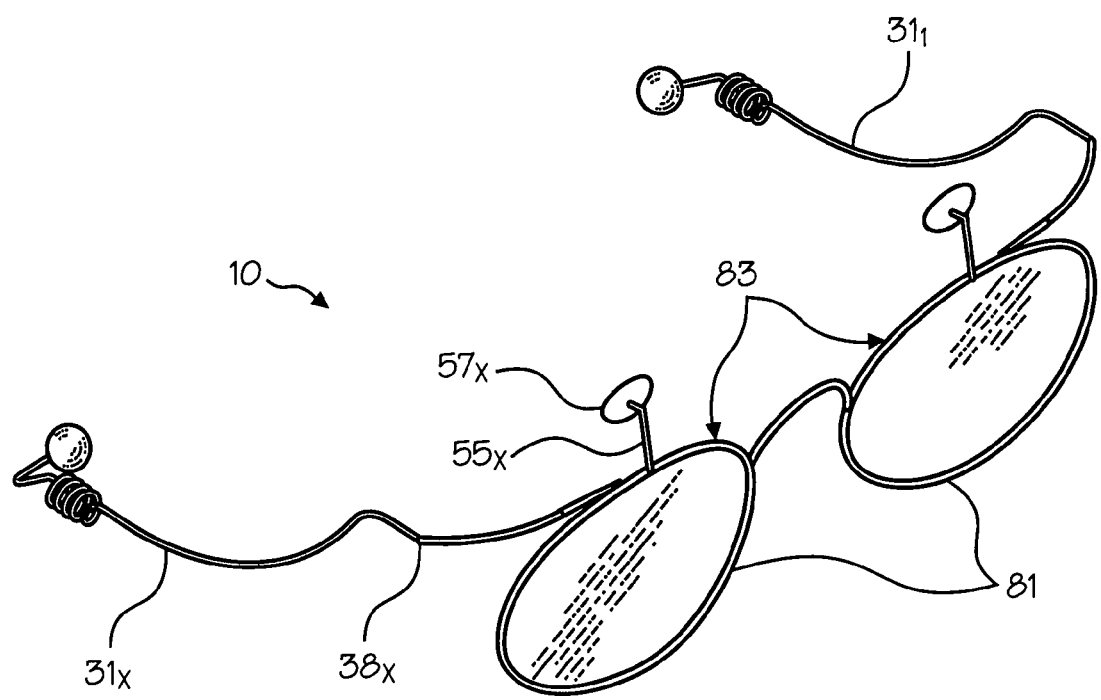
FIG. 8a illustrates another embodiment of the present invention, in particular, a front side perspective view featuring optics and a plurality of forehead stabilizers.
Figure 8B:
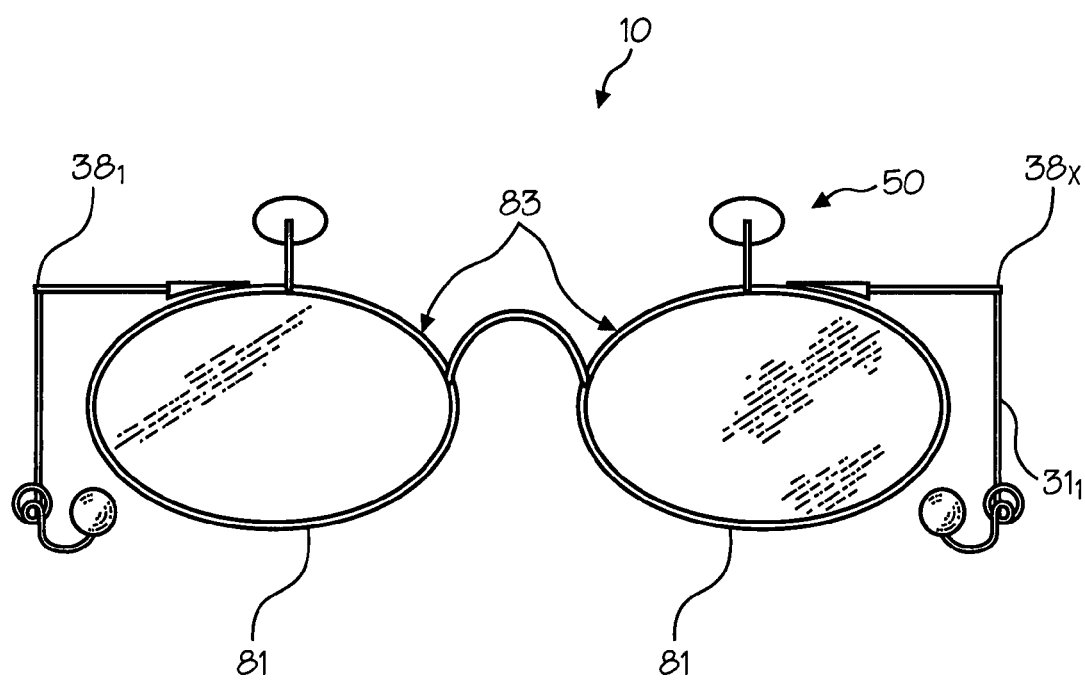
Figure 8C:
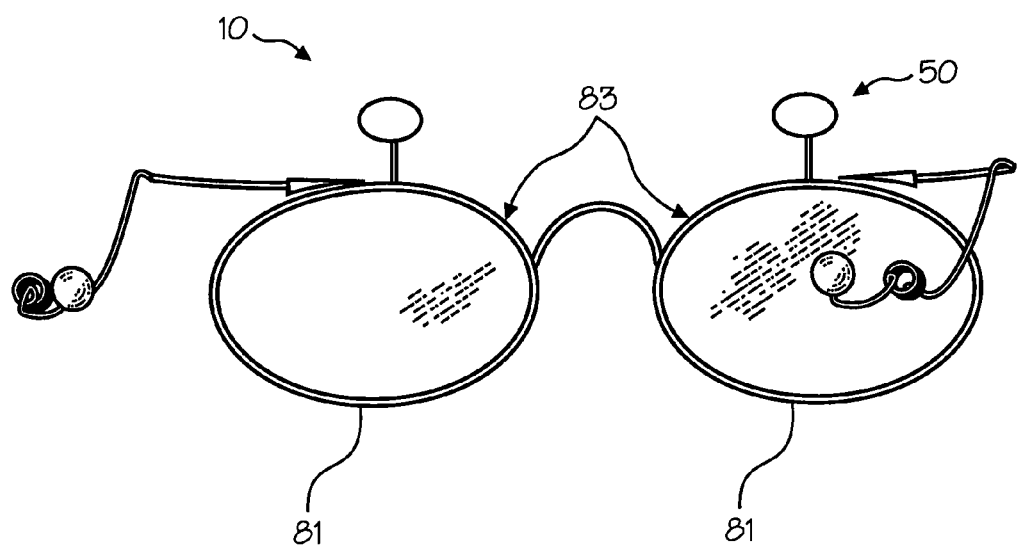
Figure 8D:
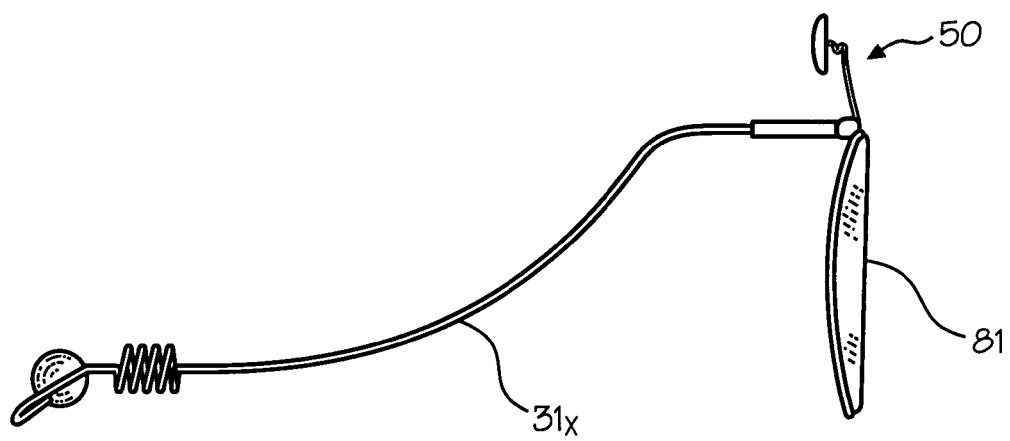
Figure 8E:
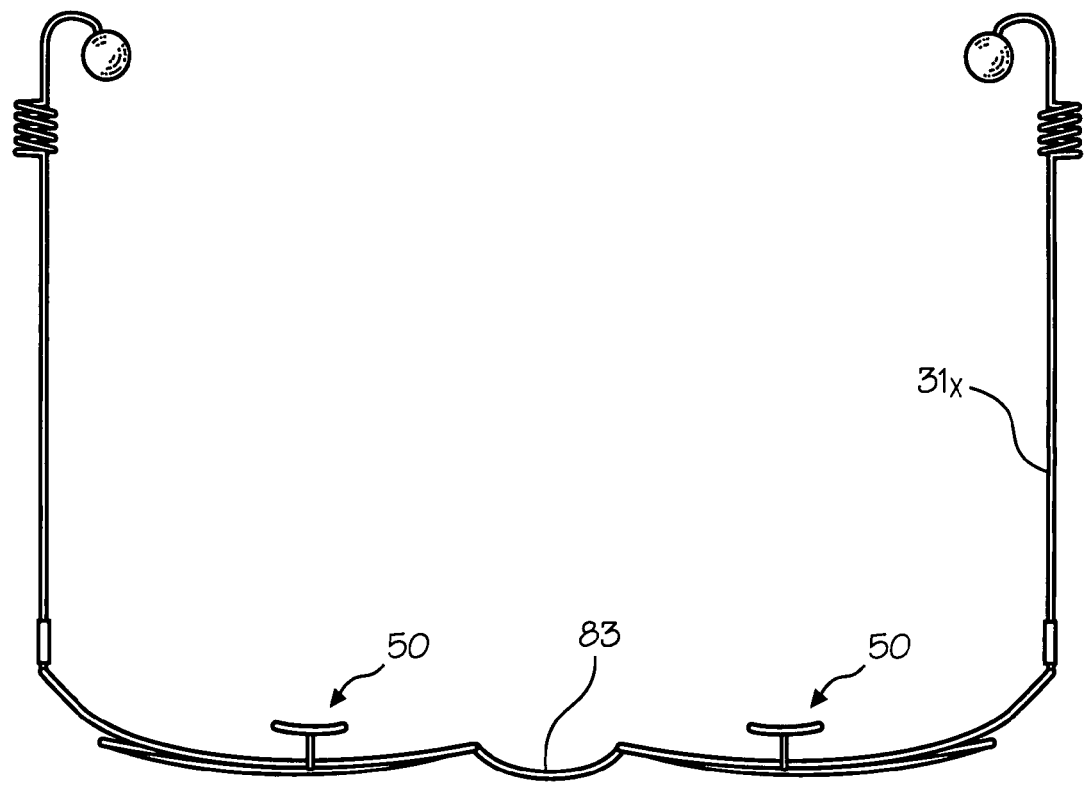
Figure 8F:
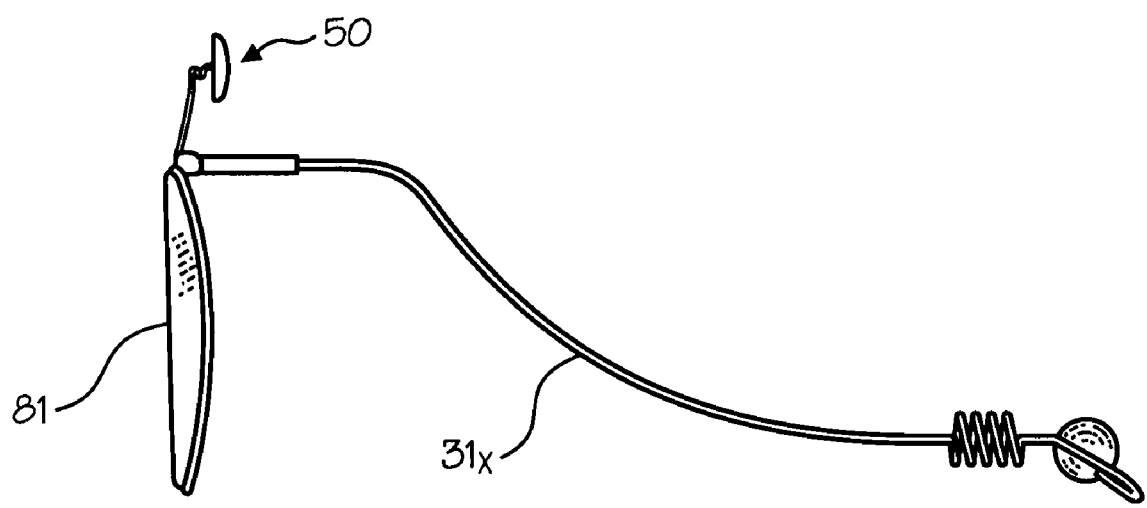

Another embodiment of the present invention is illustrated in FIG. 7a-7b. In this embodiment, a plurality of optional forehead stabilizers $57_1$, $57_x$ are coupled to the forehead bridge 41 above the forehead bridge 41, while a nasion bridge 51 is coupled to the forehead bridge 41 at a point substantially center between each pivot point $38_x$. In this embodiment, the forehead stabilizers $57_x$ are located on and above the forehead bridge 41 at points substantially equidistant between each pivot point $38_x$.

As recited above, the present invention allows for use of (and therefore, coupling with) a multitude of third party devices, including (but not limited to) optics, shading devices, eye protection devices, eye enhancement devices, line of sight devices, face protection devices, electronic devices, computers, or any other third party device which requires a stable foundation for operation which typically requires use of a user's other appendages. Moreover, while numerous significant advantages over the prior art have been described and disclosed, the present invention is also a useful advancement in the arena of eyeglass frames. In this fashion, in one embodiment as seen in FIGS. 8a-8f, the present invention contemplates securing an optical means 81 via a third party bridge 83 placed at a predetermined location on the forehead bridge 41 (preferably positioned above the useful field of vision) and preferably having a substantially rigid construction between the third party bridge 83 and the forehead bridge 41 supporting the optics 81. In this embodiment, the present invention further includes an eyeglass frame 10 having two arms $31_1$, $31_x$, a forehead bridge 41 connecting the arms therebetween, at least one forehead stabilizer 57x connected to the forehead bridge 41 through a forehead stabilizer bridge $55_x$, and at least a pair of eyeglass optics 81 attached to the forehead bridge equidistantly between the two pivot points $38_1$, $38_x$ via an eyeglass bridge 83. In this embodiment, a nasion bridge is absent. However, those of skill in the art will now realize that only one forehead stabilizer 50 may be used instead of a plurality of forehead stabilizers, and further, will recognize that a nasion bridge (not shown) may be formed into the apparatus (either as an optional accessory, or by direct mechanical coupling); Further, while the optics illustrated in FIGS. 8a-8g are eyeglass lenses, the present invention is not limited to optical lenses, but any type or form of optics as desired by the user. Again, through this disclosed structure, the present invention is adapted to substantially reduce or eliminate human ailments associated with the use of frames in the face area of the human head. This structure is not different substantially than any of the foregoing embodiments, but provides a significant technological advancement in the eyeglass frame industry heretofore unknown.

Figure 9A:
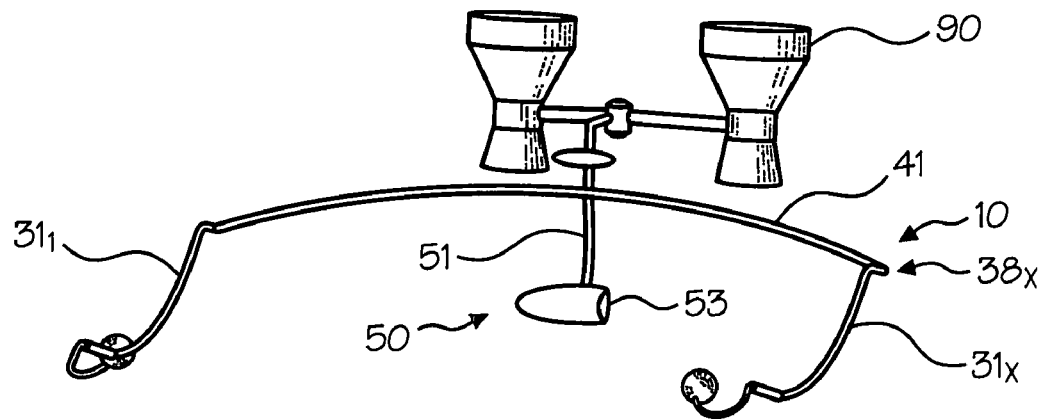
FIG. 9a illustrates another embodiment of the present invention, in particular, a front side perspective view featuring a nasion bridge, a forehead stabilizer and an optical device attached to the forehead bridge, the optics being located in an open or "up" position.
Figure 9B:
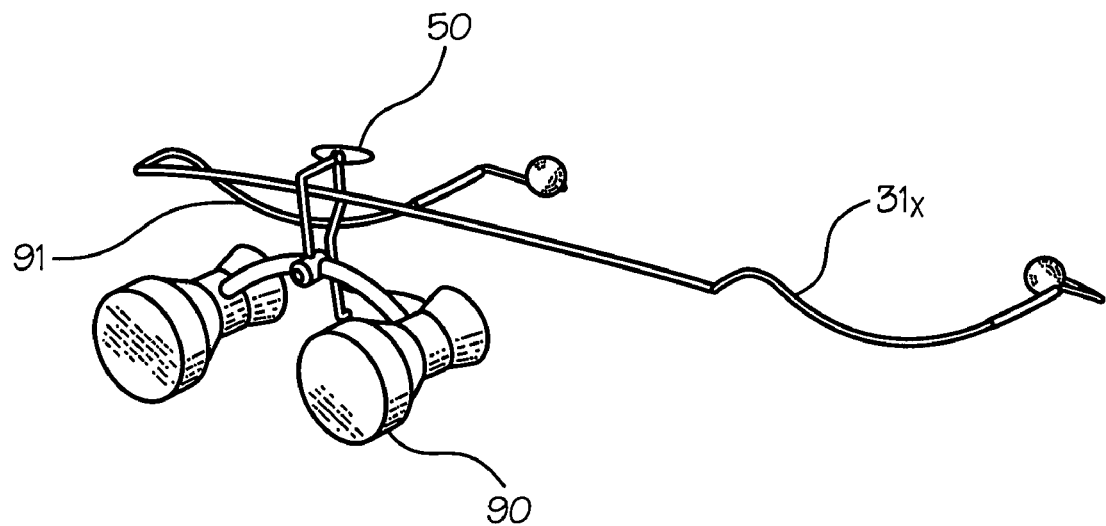
FIG. 9b illustrates another embodiment of the present invention, in particular, a front side perspective view featuring a nasion bridge, a forehead stabilizer and an optical device attached to the forehead bridge, the optics being located in an closed or "down" position.
Figure 10:
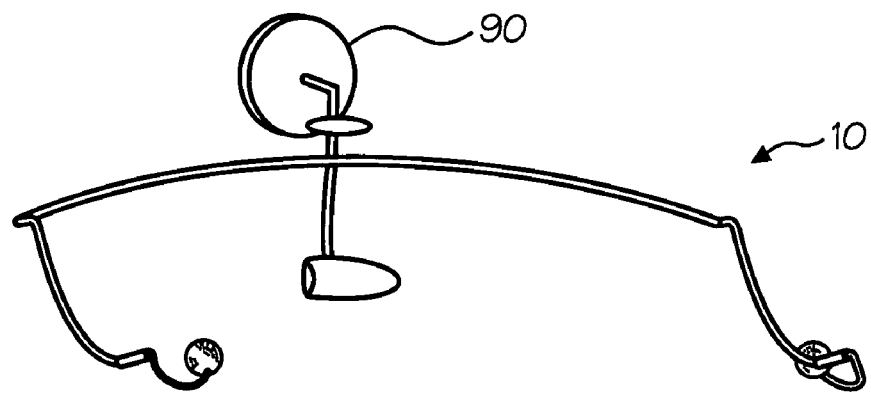
FIG. 10 illustrates another embodiment of the present invention, in particular, a front side perspective view featuring a nasion bridge, a forehead stabilizer and an optical device attached to the forehead bridge, the optics being in this embodiment a light source.
Figure 11:
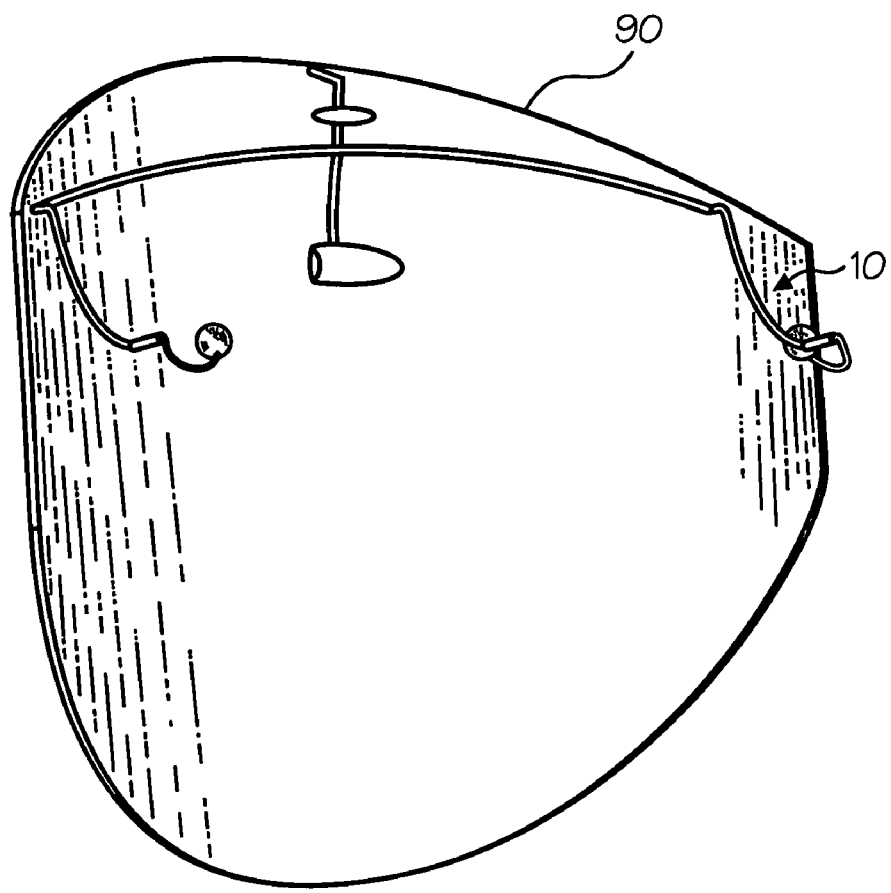
FIG. 11 illustrates another embodiment of the present invention, in particular, a front side perspective view featuring a nasion bridge, a forehead stabilizer and a protective face shield.

FIGS. 9a-9b illustrates another embodiment of the present invention. In this embodiment, the present invention further includes an frame 10 having two arms $31_1$, $31_x$, a forehead bridge 41 connecting the arms therebetween, a nasion bridge 50 substantially centered at one end upon the forehead bridge 41, and a nasion base 53 at another end, and at least an optical device 90 attached to the forehead bridge 41 at a predetermined location equidistantly between the two pivot points $38_x$ via an optics bridge 91, and a nasion bridge 51. In this embodiment, optics bridge 91 is preferably adapted for angular adjustment so that any optics employed (such as a binoculars 90, as shows in the Figures) may either be adjusted upwards (and, therefore, away from the line of sight) to a downwards, stable position (and therefore, within the user's line of sight). While binoculars or microscopes are shown as the optics in this embodiment, any device may be similarly mounted (such as, for example, a lamp or light device, which may be beneficial to surgeons, dentists or anyone who desires the use of hands-free operation of the optics; another example may include a sight shield or a sight filter, which may be useful for welders of those users having a need to filter light). Both of these embodiments are illustrated in exemplary format in FIGS. 10 and 11, where in FIG. 10, the optics includes a lamp or light device 90, and in FIG. 11, the optics includes a shield or filter 90. Those of skill in the art will realize that shield 90 may encompass many types of shield, including a light shield to protect from electrical arch sparks, for example, or a shield to protect the face from blood splatter during surgery, or to protect the human face from other elements (such as arising from chemicals splash or spray, etc.).

Figure 12A:
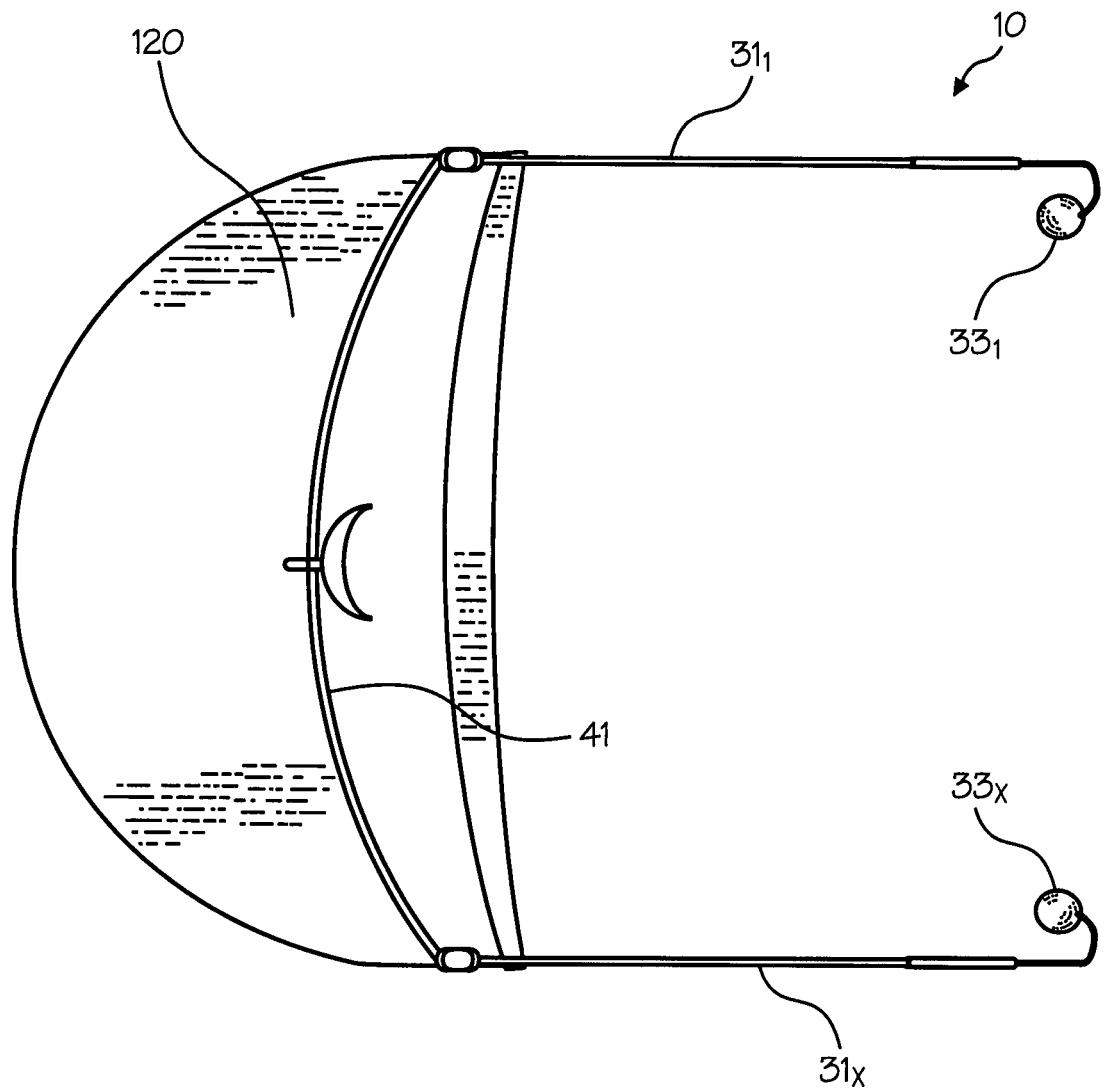
FIG. 12a illustrates another embodiment of the present invention, in particular, a bottom plan view of a frame having a nasion bridge and a light shielding device.
Figure 12B:
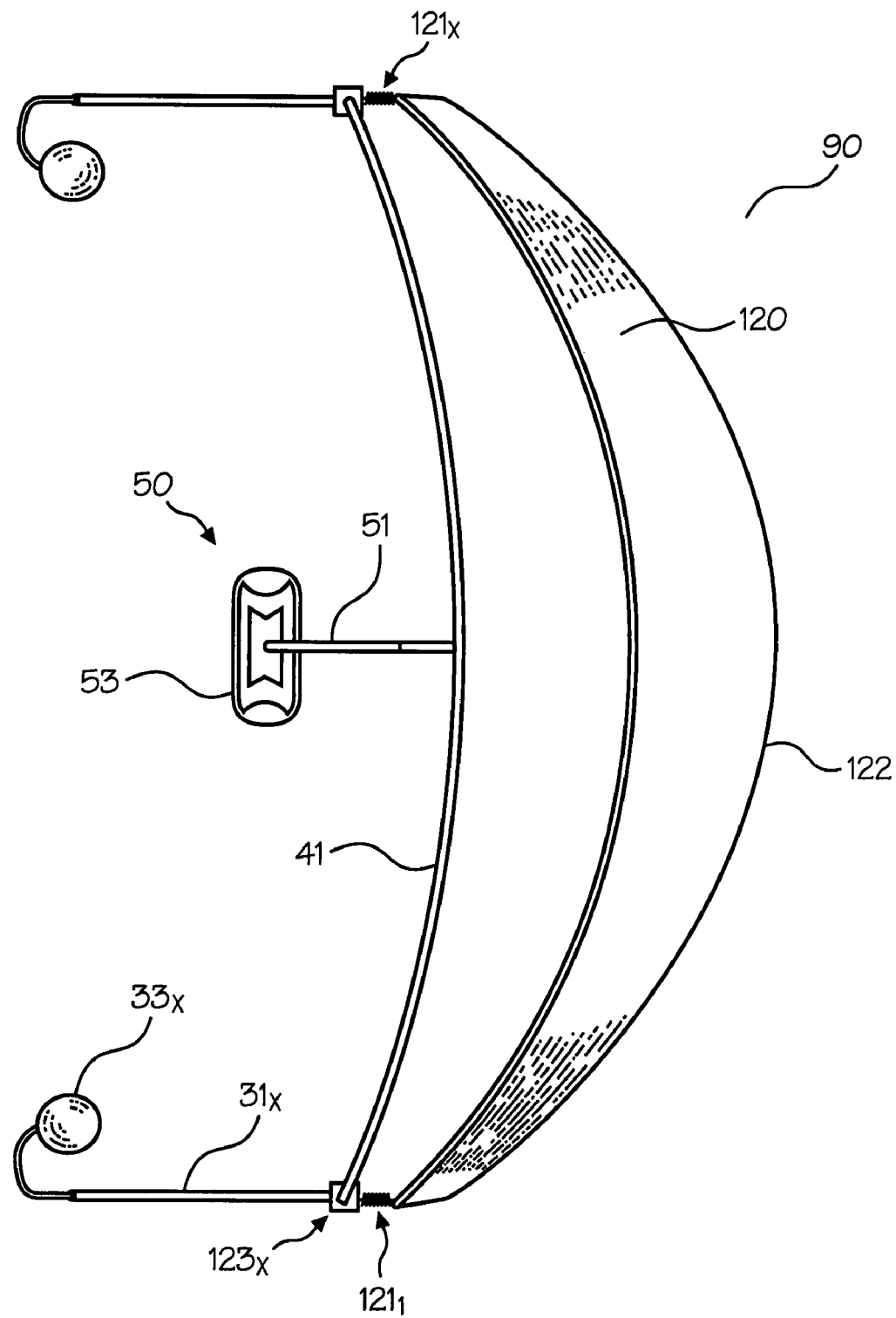
Figure 12C:
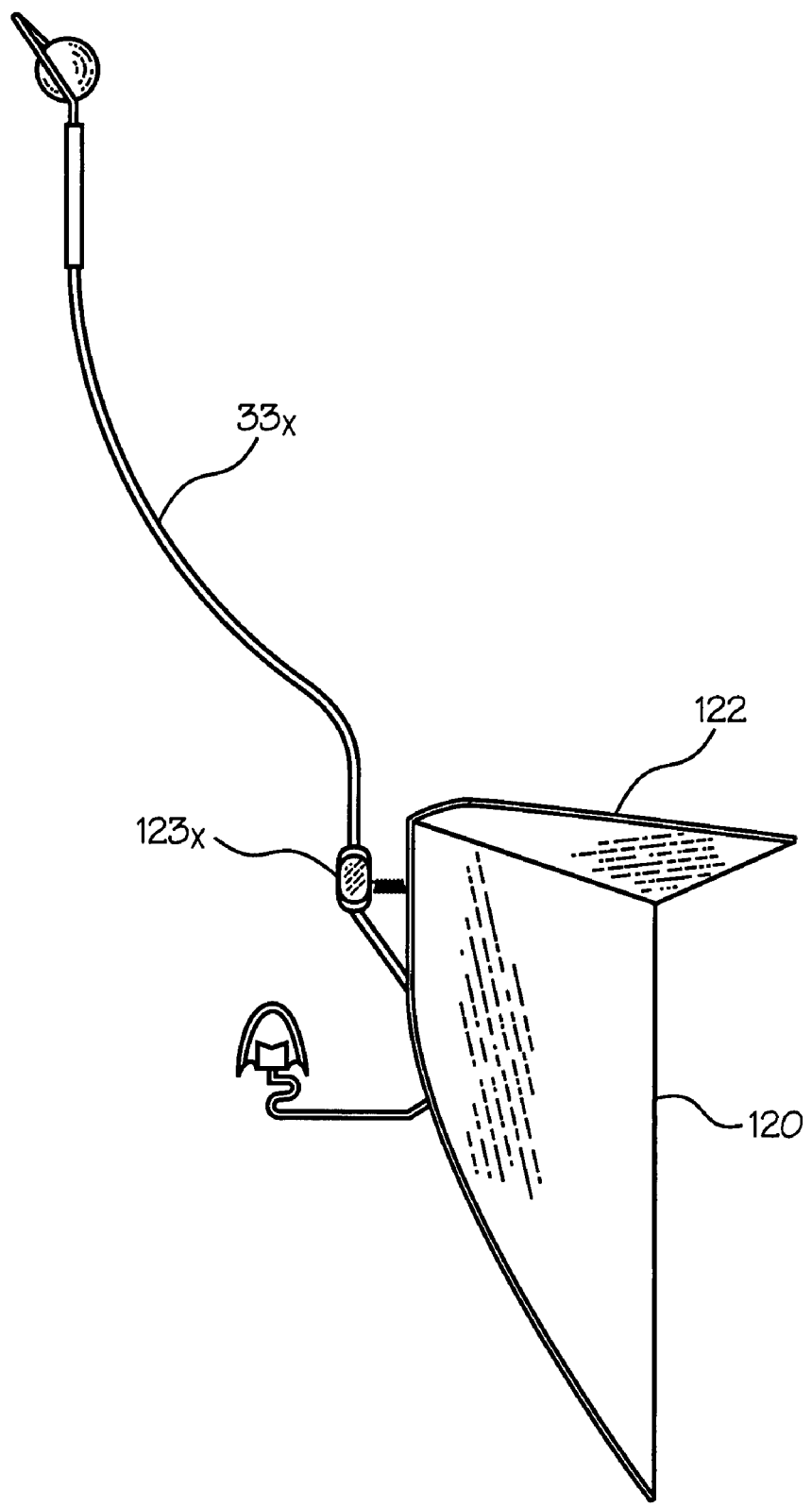
Figure 12D:
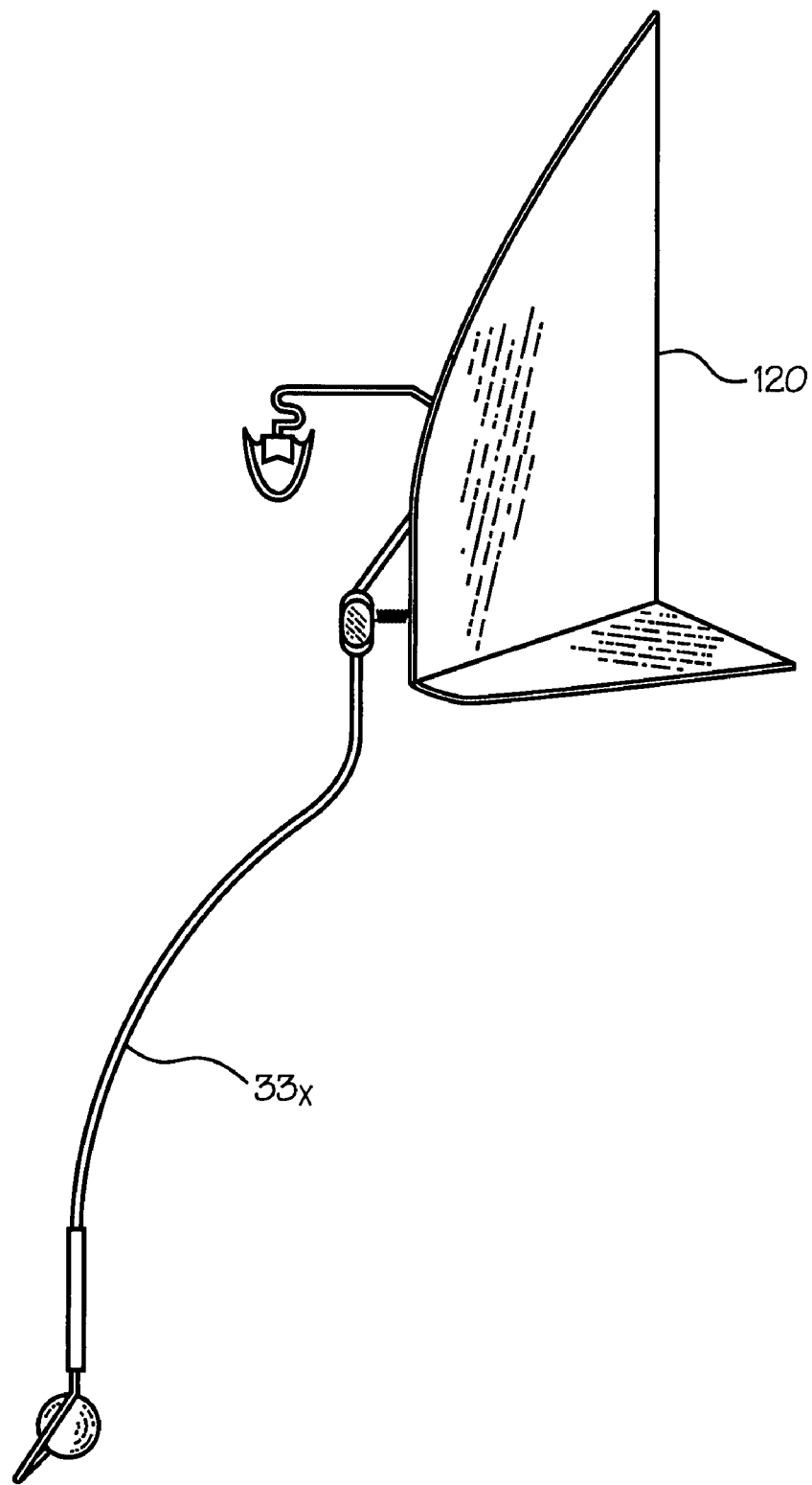
Figure 12E:
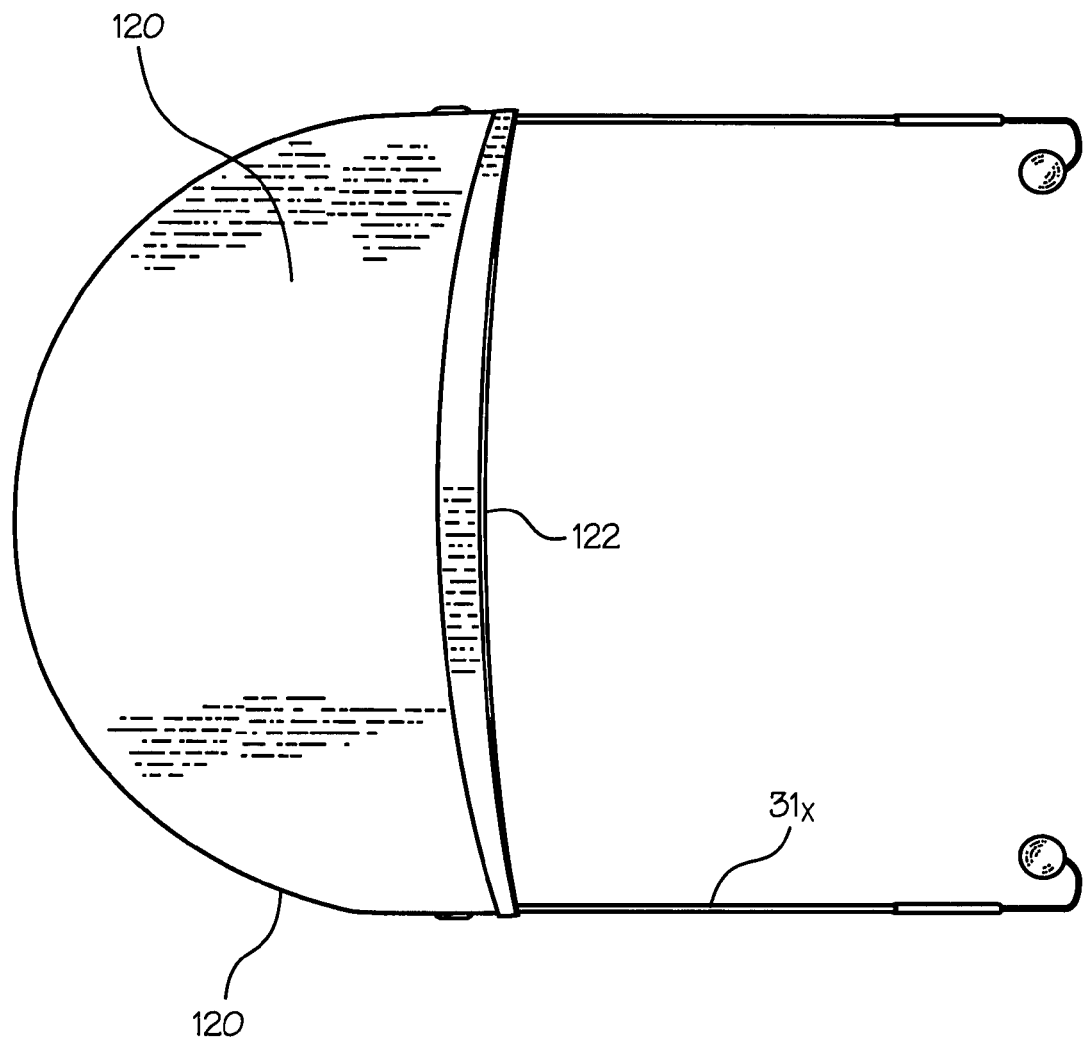
Figure 12F:
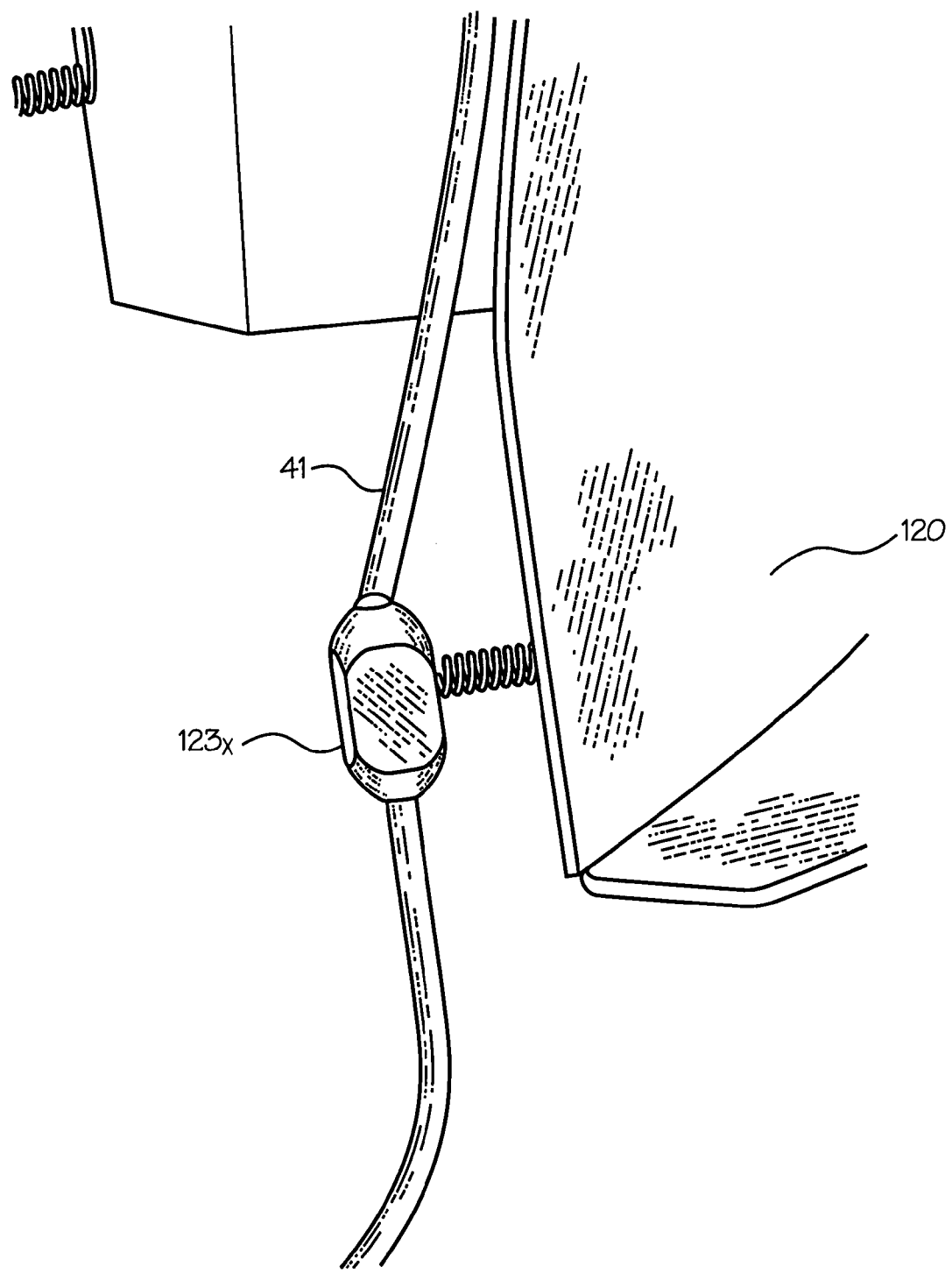
Figure 12G:
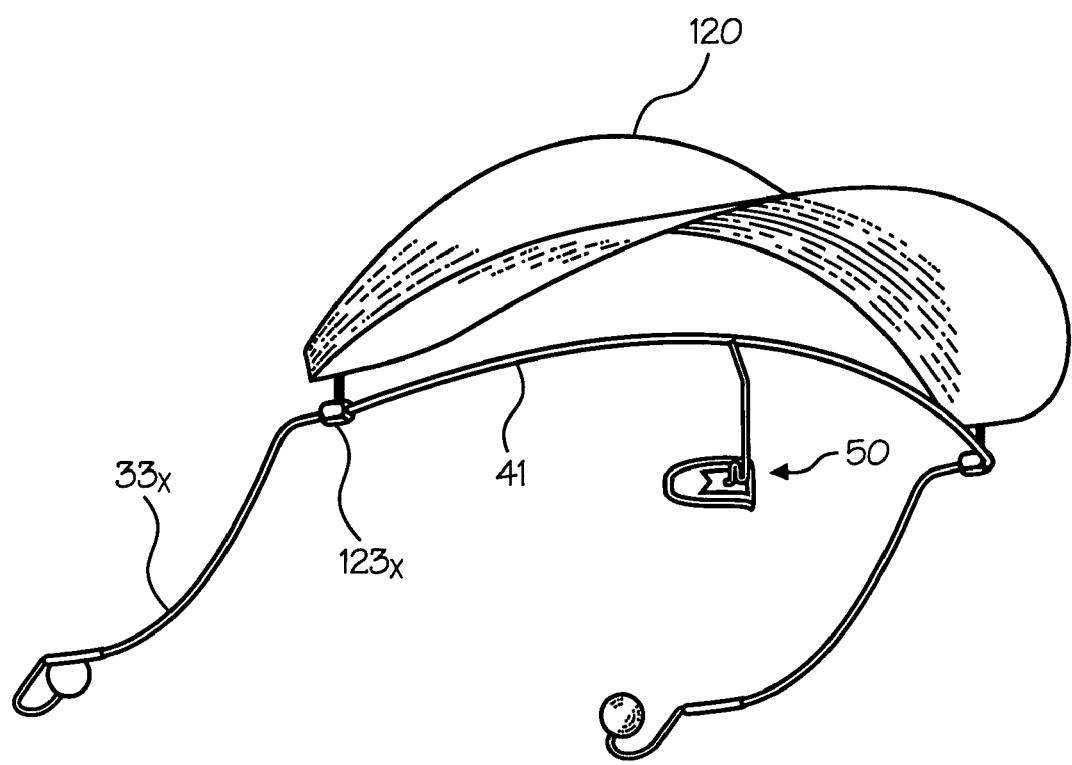

FIGS. 12a-12g illustrate another embodiment of the present device. In this embodiment, the present invention further includes a frame 10 having two arms $31_1$, $31_x$, a forehead bridge 41 connecting the arms therebetween, a nasion bridge 51 substantially centered at one end upon the forehead bridge 41, and a nasion base 53 at another end, and at least a light shielding device 120 attached to the forehead bridge at the two pivot points $38_1$, $38_x$ via a plurality of light shielding bridges $121_1$, $121_x$. In this embodiment, the light shielding device 120 may either be permanently mounted to the frame 10, or alternatively, it may be removeably secured to the frame 10 by, for example, a male/female coupling means (not shown) at any point in the frame 10. Additionally, the light shielding device 120 may be pivotable or otherwise moveable at the two pivot points $38_1$, $38_x$, or may otherwise be formed stationary depending on the end use. In this embodiment, as illustrated in FIG. 12b for example, one preferred approach to couple the light shielding device 120 to the frame 10 is through a pair of spirals which may be securely insertable into blocks $123_1$, $123_x$ (shown in exploded view in FIG. 12f) formed on or connected to the frame 10. Of course, while blocks $123_1$, $123_x$ are disclosed, those of skill in the art will realize that any other type of coupling system, whether stable to prevent angular rotation of the light shielding device, or rotatable to allow easy horizontal and/or vertical movement of any third party device attached to the frame (such as, for example, the light shielding device). Optionally, a rear portion 122 of the light shielding device 120 may function as a forehead bridge 41, thereby dispensing with the need for a forehead bridge structure 41.

Clearly, the present invention has many applications for retention of third party apparatus or devices. Another such embodiment may include use of the frame to retain a line of sight device (not shown) which is in communication with a secondary source (such as a computer, weapon, or other device which requires a user's hands to be free to control the secondary source while at the same time keeping a line of sight on the target). An exemplary line of sight device may be an optical targeting device which allows a user to clearly view distant objects or targets, and through the electronically attached secondary source, a user may control the secondary source electronically coupled to the line of sight device to appropriately target the remote object.

The present invention is preferably adapted to be readily adjusted in one or more positions (or angular positions, as the embodiment may recite) which affords clarity of sight in the user's field of view, and maximum protection for the eyes.

While the scope of the present invention should not be limited to any particular theory of operation, it should be instructive to speculate on such in order to provide the reader with a full understanding of this invention and its preferred embodiment.

Other variations and modifications of the present invention will be apparent to those of ordinary skill in the art, and it is the intent of the appended claims that such variations and modifications be covered. The particular values and configurations discussed above can be varied, are cited to illustrate representative embodiments of the present invention and are not intended to limit the scope of the invention.

Other variations and modifications of the present invention will be apparent to those of ordinary skill in the art, and is not limited except by the appended claims. The particular values and configurations discussed above can be varied, and are cited to illustrate particular embodiments of the present invention. It is contemplated that the use of the present invention can involve components having different characteristics as long as the principles disclosed herein are followed.

The invention claimed is:

1. A system for attaching at least one article to the human head, the system comprising a frame, the frame defined by a plurality of arms, each arm having a distal end and a near end, a forehead bridge connecting the arms therebetween at each arm's near ends, and a plurality of ear buds, each ear bud being coupled to each arm's distal end, each ear bud further comprising an inner concha portion adapted to securely fit within a human ear's concha, the frame adapted to retain or otherwise securely hold at least one third party device thereon.

2. The system of claim 1 further comprising at least one nasion support means, each nasion support means comprising a nasion bridge substantially centered at one end upon the forehead bridge, and a nasion base at another end, the nasion base adapted to cover the vertical and horizontal surface areas of human skull nasion area, to thereby comfortably, securely and precisely lock the position of the frame in place and prevent vertical and/or horizontal movement.

3. The system of claim 1 further comprising at least one forehead stabilizer, each forehead stabilizer being coupled to the forehead bridge at a pre-desired location.

4. The system of claim 1 further comprising a plurality of loops, each loop interconnecting each ear bud with each arm at each arm's distal end.

5. The system of claim 4, each loop further connecting to a angle portion, each angle portion having between a twenty degree and forty degree angular break, each angle portion adapted to angularly break to a desired position.

6. The system of claim 5 further comprising a pivot coupling means on each arm's near end, each pivot coupling means adapted to couple each arm to the forehead bridge, allow angular rotation of each arm relative to the forehead bridge, and allow mechanical communication with each adjacent loop for adjustment.

7. The apparatus of claim 6 further comprising a protective sheath surrounding each ear bud, and a nasion protective sheath covering the nasion base.

8. The apparatus of claim 6 further comprising a plurality of length adjustments, each length adjustment interconnecting each loop to the distal end of each arm.

9. A system for attaching at least one article to the human head, the system comprising a frame, the frame defined by a plurality of arms, each arm having a distal end and a pivotable near end, a forehead bridge connecting the arms therebetween at each arm's pivotable near ends, a plurality of ear buds, each ear bud being coupled to each arm's distal end, each ear bud further comprising an inner concha portion adapted to securely fit within a human ear's concha, and at least one forehead stabilizer coupled to the forehead bridge at a pre-desired location, the frame adapted to retain or otherwise securely hold at least one third party device thereon.

* * * * *